US012601204B2

(12) United States Patent
Laumet et al.

(10) Patent No.: US 12,601,204 B2
(45) Date of Patent: Apr. 14, 2026

(54) SMART LOCK

(71) Applicant: Mosa Innovations Limited, London (GB)

(72) Inventors: Simon Laumet, London (GB); Chiu-Ming Liu, London (GB)

(73) Assignee: Mosa Innovations Limited, London (GB)

( * ) Notice: Subject to any disclaimer, the term of this patent is extended or adjusted under 35 U.S.C. 154(b) by 23 days.

(21) Appl. No.: 18/579,083

(22) PCT Filed: Jul. 13, 2022

(86) PCT No.: PCT/GB2022/051817
§ 371 (c)(1),
(2) Date: Jan. 12, 2024

(87) PCT Pub. No.: WO2023/285819
PCT Pub. Date: Jan. 19, 2023

(65) Prior Publication Data

US 2024/0384571 A1 Nov. 21, 2024

(30) Foreign Application Priority Data

Jul. 13, 2021 (GB) .................................... 2110059

(51) Int. Cl.
*E05B 71/00* (2006.01)

(52) U.S. Cl.
CPC .................................. *E05B 71/00* (2013.01)

(58) Field of Classification Search
CPC ...................................................... E05B 71/00
USPC ........................................................... 70/233
See application file for complete search history.

(56) References Cited

U.S. PATENT DOCUMENTS

| | | | | |
|---|---|---|---|---|
| 3,865,244 | A * | 2/1975 | Galen ..................... | B62H 3/08 211/5 |
| 4,776,188 | A | 10/1988 | Dalaba et al. | |
| 5,408,212 | A | 4/1995 | Meyers et al. | |
| 12,227,250 | B1 * | 2/2025 | Marshall .................. | B62H 3/12 |
| 2015/0330109 | A1 * | 11/2015 | Tepper ................... | G05B 15/02 700/237 |
| 2017/0069154 | A1 * | 3/2017 | Hilton ..................... | E05B 71/00 |
| 2019/0028478 | A1 * | 1/2019 | Love ...................... | H04L 63/102 |
| 2020/0240173 | A1 | 7/2020 | Levavi et al. | |

(Continued)

FOREIGN PATENT DOCUMENTS

| | | | |
|---|---|---|---|
| CN | 105840013 | A * | 8/2016 |
| DE | 102015005411 | A1 | 11/2016 |

(Continued)

OTHER PUBLICATIONS

Machine Translation of TW I629401 B (Year: 2018).*

(Continued)

*Primary Examiner* — Christine M Mills
(74) *Attorney, Agent, or Firm* — Stanek Lemon Crouse & Meeks, PA

(57) ABSTRACT

A smart lock for securing a bicycle to a bicycle rack is provided. The smart lock comprises a bicycle rack attachment, configured to attach the smart lock to the bicycle rack. The smart lock further comprises a smart locking mechanism, distinct from the bicycle rack attachment, configured to permit an authorised user to releasably secure the bicycle to the smart lock.

20 Claims, 12 Drawing Sheets

(56) References Cited

U.S. PATENT DOCUMENTS

| | | | | |
|---|---|---|---|---|
| 2021/0189770 | A1* | 6/2021 | Evarts | E05B 73/00 |
| 2023/0038677 | A1* | 2/2023 | Wang | B62H 5/141 |

FOREIGN PATENT DOCUMENTS

| | | | | | |
|---|---|---|---|---|---|
| EP | 3567194 | A1 | | 11/2019 | |
| GB | 2515716 | A | * | 1/2015 | B62H 3/00 |
| GB | 2550861 | A | | 6/2017 | |
| GB | 2554816 | A | * | 4/2018 | B62H 3/00 |
| GB | 2629585 | A | * | 11/2024 | B62H 3/00 |
| TW | I629401 | B | * | 7/2018 | |
| WO | WO-2017027902 | A1 | * | 2/2017 | B62H 3/04 |
| WO | WO-2019204726 | A1 | * | 10/2019 | B62H 5/00 |

OTHER PUBLICATIONS

International Search Report and Written Opinion, PCT/GB2022/051817, Sep. 30, 2022, 7 pages.
Combined Search and Examination Report, GB2110059.9, Dec. 7, 2021, 8 pages.
Examination Report, GB2110059.9, Oct. 10, 2023, 4 pages.
Office Action, European Application No. 22747388.1, Nov. 27, 2025, 3 pages.

* cited by examiner

SMART LOCK

CROSS-REFERENCE TO RELATED APPLICATIONS

This application is a 35 U.S.C. § 371 National Stage Entry of International Application No. PCT/GB2022/051817 having an international filing date of Jul. 13, 2022, which claims the benefit of Great Britain Application No. 2110059.9, filed Jul. 13, 2021, the contents of which are hereby incorporated herein by reference in their entireties.

FIELD OF THE DISCLOSURE

The present disclosure relates to a smart lock and a system comprising such a smart lock.

BACKGROUND TO THE DISCLOSURE

Smart locks are electromechanical locks that are designed to perform locking and unlocking operations when instructions are received from an authorised user or device. Such instructions are often received using a wireless communication protocol. Smart locks typically require two main constituents in order to work: the lock and the key. In the case of smart locks, the key is not usually a physical key but may be a cryptographic key, which may be provided by a smartphone or a card or key fob configured for this purpose. Such cryptographic keys can be used for the authentication needed to unlock the smart lock. This key can be sent to the recipient smartphone over standard messaging protocols. Once this key is received, the recipient will be able to unlock the smart lock, for example during a specified period of time. Many smart locks are able to grant or deny access remotely via a mobile application. Moreover, certain smart locks include built-in internet connections that allow for monitoring, such as access notifications or cameras to show the person requesting access. Smart locks are most commonly provided for controlling access to buildings, although smart bicycle locks have also been described.

Bicycle-sharing systems allow bicycles to be made available for shared use to individuals on a short-term basis. Many bicycle-sharing systems allow people to borrow a bicycle from a dock and return it at another dock belonging to the same system. Docks are special bicycle racks that lock bicycles and allow them to be released by computer control. Typically, a user enters payment information, and the computer unlocks a bicycle. The user returns the bicycle by placing it in the dock, which locks it in place. Dockless systems also exist and in such systems, bicycles may be left in an immobilised state in the street (rather than locked to a physical object) for the next user to use. From the user's perspective, an advantage of such systems is that they do not need to carry a bicycle or a lock.

While existing smart locking systems and bicycle-sharing systems offer some advantages, there is a need for more flexible systems. Moreover, rented bicycles are not always kept in good condition, meaning that a rented bicycle may not be safe. It is an object of the present to disclosure to address these and other problems with known locking and bicycle-sharing systems.

SUMMARY OF THE DISCLOSURE

Against this background and in accordance with a first aspect, there is provided a smart lock according to claim 1. The present disclosure relates to electronic smart locks that can be retrofitted to existing bicycle racks and which are typically operated (opened and closed, or locked and unlocked) by a user's smartphone. To this end, a bicycle rack attachment is provided, which configured to attach a smart lock to a bicycle rack, and thereby to allow the smart locks described herein to be retrofitted to existing bicycle racks.

Preferred locks described herein have no external keyholes, ports, or interfaces (e.g. keypad, fingerprint reader etc.). Moreover, the smart locks described herein generally do not connect to the internet and the smart locking mechanisms can be operated without a direct internet connection. Additionally, the locks described herein are capable of being retrofitted without the need to modify existing infrastructure. Thus, the smart locks described herein are convenient, durable and can have low power requirements.

Because the locks described herein can be retrofitted to existing bicycle racks, they can be provided with rechargeable batteries avoiding the need for connections to external power sources. Moreover, the locks can be extremely secure and durable, because they do not need to be transported by a user on their bicycle. Accordingly, a 4 mm thick (or more) hardened steel body can be used in combination with a 12 mm thick (or thicker) chain, and the locks described herein may weight 15 kg (or more) per unit. The smart locks described herein may have different grades and thicknesses of chain (or cable) to suit different levels of risk in the environments where they will be deployed. For example, an indoor office lock may only require a lighter and easier to use 8 mm chain or a Kevlar-braided security cable. Nevertheless, the locks described herein can be significantly more robust than the locks that bicycle users typically carry around when bicycling. Moreover, because a user can use their own bicycle, rather than a shared bicycle, they do not run the risk of using a bicycle that is poorly-maintained, so safety is improved.

Access keys for the smart locks are generated by servers of the systems described herein and sent to a user's phone while the phone is connected to the internet. These keys are temporarily stored on the user's phone to be used with the smart locks of the present disclosure. In the context of this disclosure, any reference to a "key" or "keys" refers to a sting of code that gives access to a digital system and not to a physical key. The keys described herein may comprise a message (containing a time-stamp, user ID, access information, and any logs) that has been encrypted with a cipher. Only the server and the lock may be aware of what cipher is required to decrypt the message. Different locks will have different ciphers so that even if a thief steals the hardware and manages to obtain the code from the chip's memory, they would not be able to access other locks because of the unique cipher used.

It will be appreciated that bicycles and bicycle racks are referred to extensively herein but are not themselves part of the aspects and embodiments of this disclosure. The disclosure relates to smart locks that are suitable for attaching existing bicycles to existing bicycle racks.

BRIEF LISTING OF FIGURES

The present disclosure will now be described by way of example, with reference to the accompanying figures, in which.

DETAILED DESCRIPTION OF PREFERRED EMBODIMENTS

Figure 1:
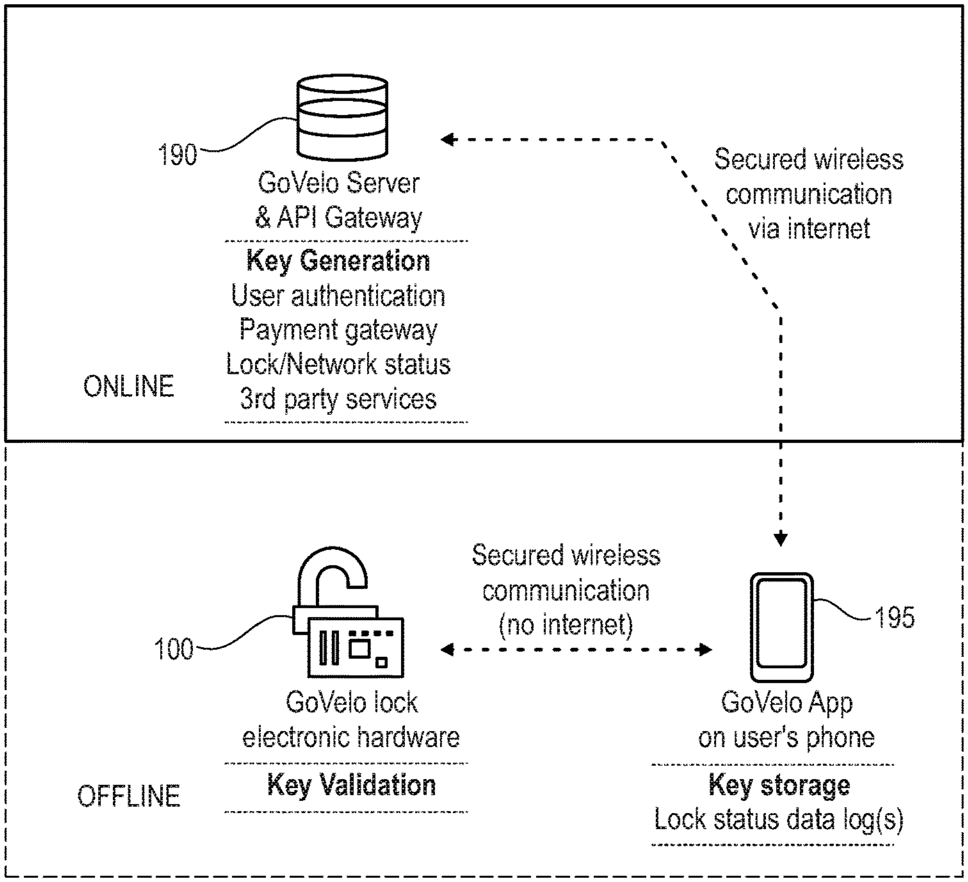
FIG. 1 shows an overview of an environment in which the smart locks of the present disclosure can be implemented.

In FIG. 1, there is shown an overview of an environment in which the smart locks 100 of the present disclosure can be implemented. The environment comprises a lock 100, a mobile device 195 having stored thereon an application and a server 190. The lock 100 comprises electronic hardware and is configured for performing key validation. The application on the mobile device 195 is configured for key storage and data logging. The lock 100 and the mobile device 195 are configured to communicate over secured wireless communication even when no internet connection is present. The server 190 is configured for key generation, user authentication, acting as a payment gateway, for monitoring and controlling lock/network status, and for interfacing with third party services. The mobile device 195 and the server 190 are configured to communicate between each other over a secured wireless communication via the internet.

In FIG. 1, it can be seen that a user's phone 195 connects to a cloud server 190 via the internet (WiFi or cellular) to request a key that is generated by the server 190. The server 190 will authenticate the user and check network status before transmitting a key to the user's phone 195. This cloud-generated key is securely stored on the user's phone 195 for future access to locks such as the lock 100. The key is only valid for a period of time determined by the cloud server 190.

The lock 100 itself has no internet capabilities and so the lower half of FIG. 1 shows processes that occur entirely offline. However, the lock 100 is able to perform key validation and is able to measure usage, session duration, and tampering of the lock 100. For example, the locks described herein may comprise an accelerometer, wherein the smart lock is configured to transmit a report to a user's mobile device (which may then send the report to a server) and/or sound an alarm in response to data from the accelerometer being indicative of tampering. As the lock will log such information, to be transmitted to a user's smartphone upon next access, the phone will then forward the data log to the server. Therefore, error and tamper logging will not necessarily occur in real-time, but sounding an alarm can be done in real-time. When a user's phone 195 connects to the lock 100 using the stored key to start a session (e.g. to unlock, attach a bicycle, and re-lock the bicycle), the lock 100 transmits its status data log (which may include, for example, information indicating the usage of the lock, any session duration, and/or any tampering of the lock) to the phone 195.

The phone 195 acts as a data mule for the data log of the lock 100, so that the lock 100 can be installed and used in areas with no internet connection (e.g. in underground parking, etc.). In particular, the phone 195 temporarily stores data logs before transmitting the data logs to the cloud server 190 once the phone 195 regains internet connectivity. If the user's phone 195 has internet access when the lock 100 sends its status data logs, then they are immediately sent to the cloud server 190. Thus, connectivity is assured even in scenarios in which a mobile connection is not typically available. Accordingly, the architecture shown in FIG. 1 is advantageous for permitting retrofitting of smart locks such as lock 100.

Figure 2:
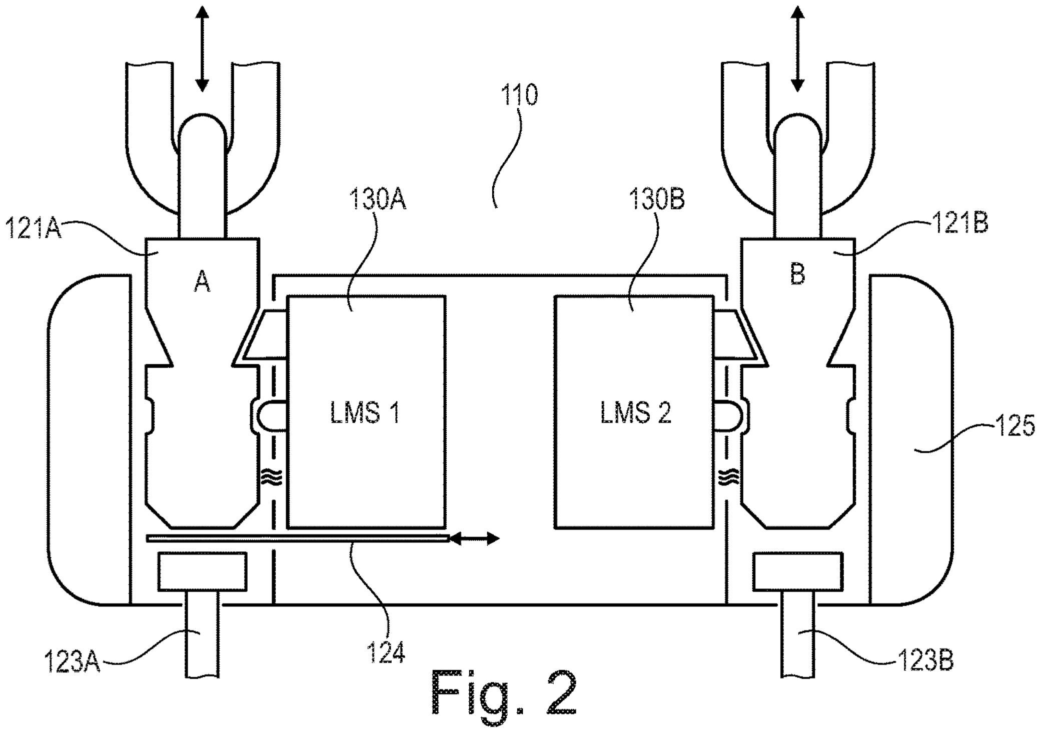
FIG. 2 shows schematically a simplified cross-section of a smart locking mechanism.

In FIG. 2, there is shown schematically a simplified cross-section of a smart locking mechanism 110, which is part of the lock 100. In FIG. 2, the arrows show the directions in which different components may be capable of moving. The smart locking mechanism 110 uses a securing element, which in this case is a chain (although a cable or shank could also be used), to secure bicycles to the smart lock 110. Both ends 121A and 121B of the chain (i.e. first and second portions of the chain) are plugged into the smart locking mechanism 110 and held in place by first and second smart locking elements 130A and 130B. The smart locking elements 130A and 130B may alternatively be described as Locking Mechanism Stacks (LMS1 and LMS2). The LMSs are responsible for securing the chain and verifying that the chain has been properly inserted.

A user's cloud-generated key is only capable of activating LMS1, 130A, which is shown on the left of FIG. 2. This means that the user can only ever take out the "A" side of the chain out of the smart locking mechanism 110 to attach their bicycle. If a user were to look into the smart locking mechanism 110 with the "A" side of the chain pulled out, they would not be able to see (or access in any way) the fastener 123A, which is a security bolt that sits at the bottom of the smart locking mechanism 110. This is due to the presence of a moveable cover 124 that protects the security bolt 123A from tampering. The moveable cover may be configured such that at least one fastener (e.g. fastener 123A, which is only accessible via the first opening and not the second opening) is not visible via the first opening. Only the left hand A side of the smart locking mechanism 110 has such a cover 124.

A system operator (otherwise known as a system administrator) is able to activate both of the LMS units 130A, LMS1 and 130B, LMS2 with an operator key. This operator key allows them to replace the chain should it be damaged (by removing both ends from the LMS units 130A, LMS1 and 130B, LMS2), but also allows them to access the security bolt cover 124 The security bolt cover 124 may be accessible by removing the B side of the securing element, which allows the back-end of the lock to be removed (as explained later with reference to FIG. 12A), so that an administrator can access the battery and the moveable security cover 124. Additionally or alternatively, the moveable cover 124 may be accessible directly via the B opening. In any case, once the bolt cover 124 is moved out of the way, the administrator is able to access and unscrew both security bolts 123A and 123B to remove the smart locking mechanism 110 from its mount(s). In this way, the smart lock can be taken away for servicing, but only by a system administrator having: the key needed to operate LMS2, 130B; and an appropriate tool for controlling the position of the moveable cover 124.

In generalised language, the bicycle rack attachments described herein may be configured so that at least a portion of the bicycle rack attachment (e.g. one or more fasteners, such as bolts 123A and/or 123B, or any other part of the bicycle rack attachment that might be vulnerable to tampering) is concealed by a body (e.g. the main body 125) of the smart lock when the smart lock is attached to the bicycle rack. Additionally or alternatively the fasteners may be concealed by the bicycle rack attachment itself. In some embodiments, the bicycle rack attachment and the body of the smart lock may collectively conceal the fasteners. Concealing a portion of the bicycle rack attachment can help to reduce the risk of someone being able to tamper with the bicycle rack attachment and thereby remove the smart lock from the bicycle rack. The bicycle rack attachments may comprise at least one fastener configured to attach the smart locks described herein to a bicycle rack, and preferably comprise at least two fasteners configured to attach the smart lock to the bicycle rack. Preferably, at least one fastener (and optionally two, three or more fasteners) is (or are) concealed by a body of the smart lock when the smart lock is attached to the bicycle rack. For example, at least one fastener (and optionally two or more such fasteners) may be within a body of the smart lock. For example, a head of the fastener may be located within the body of the smart lock and a portion of the fastener may protrude outside the body of the smart lock. This may help to reduce the risk of tampering.

It will be understood that many variations can be made to the smart locks of FIG. 2. For example, while two smart locking elements are shown, more than two or only one can be provided. For instance, LMS2 may be replaced by a permanent attachment, although this would make maintenance of the securing element more difficult. Alternatively, additional securing elements can be provided. For example, two distinct securing elements with four smart locking elements (two per securing element) may be employed. In this case, a user may be able to use one securing element for the front wheel of their bicycle and another securing element for the rear wheel of their bicycle. Additionally, more than two fasteners can be provided to improve the security of the smart lock and bicycle rack attachment. Additionally, in some cases, only one fastener may be required. It is preferred that at least one, and preferably two or all, fastener(s) of the bicycle rack attachment is/are concealed by the securing element when the securing element is in a locked configuration (i.e. inserted in the openings for receiving securing elements), so that tampering with the bicycle rack attachment can be prevented when the smart lock is in use.

Figure 3:
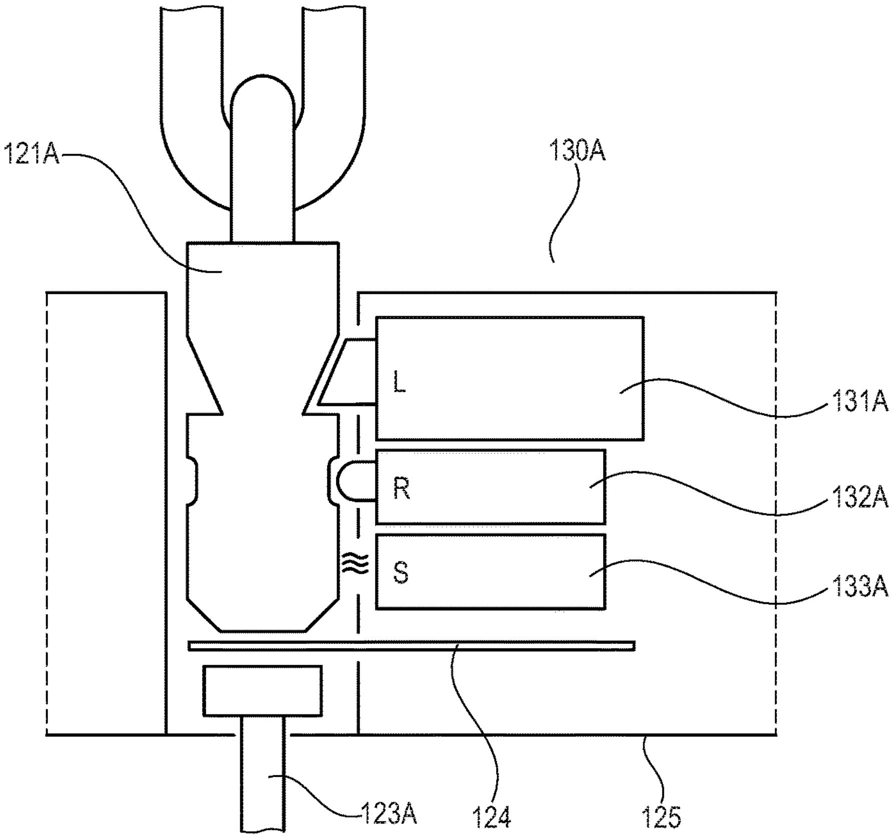
FIG. 3 shows the schematic smart locking mechanism of FIG. 2 in more detail.

In FIG. 3, there is shown a close-up, simplified cross-section of the LMS1 130A of FIG. 2, with further details shown. The securing element 121A and the fastener 123A are as described previously. The LMS1 130A comprises 3 main components: a motorised locking pin 131A that secures the chain end plug; a retaining pin 132A that prevents the chain from falling out when the motorised locking pin 131A is retracted; and a sensor 133A that detects if the chain plug has been fully inserted. The three parts of the LMS1 are contained in a body 125 (which may alternatively be described as a housing) that protects the electronic components from water and dust that can enter through the opening that receives the chain plug. In generalised terms, the smart locking elements described herein may comprise a retaining protrusion (such as the retaining pins 132A and 132B) configured to retain the securing element when the first smart locking element and/or the second smart locking element is unlocked. Various retaining protrusions may be used to achieve this functionality, such as pins, ridges, flanges or knurled surfaces. Moreover, in general terms, the smart locks described herein may comprise one or more sensors configured to sense whether the securing element is inserted into (e.g. to sense if it is inserted sufficiently far for locking to be successful or if it has been removed entirely) the first smart locking element and/or the second smart locking element, and the one or more sensors may comprise one or more microswitches or induction sensors (e.g. to detect the securing element by detecting contact or an induced signal).

The locking pin 131A is capable of being actuated so as to releasably secure a first portion of the securing element to the smart lock. The retaining pin 132A is not motorised, but acts to ensure that the chain 121A does not fall out of the LMS1 130A when in an unlocked state (e.g. to prevent the chain falling out of the lock 110 under the influence of gravity). To achieve this, the retaining pin 132A engages a corresponding indentation on the chain 121A to loosely hold the end of the chain 121A in the LMS1 130A. The sensor 133A is configured to detect if the chain 121A is inserted far enough into the LMS1 130A for the locking pin 131A to be capable of securing the chain 121A therein. Once the sensor 133A detects that the chain is inserted far enough into the LMS1 130A, then the locking pin 131A is deployed and the sensor 133A improves reliability of the locking action.

In generalised language, the smart locks described herein preferably comprise a securing element (e.g. a chain such as the chain having ends 121A and 121B, or alternatively shackles or cables) configured to releasably secure the bicycle to the smart lock. The smart locking mechanisms described herein may comprise a first smart locking element (e.g. LMS1) configured to releasably secure a first portion (e.g. one end, such as end 121A) of the securing element to the smart lock, and/or the smart locking mechanism may comprise a second smart locking element (e.g. LMS2) configured to releasably secure a second portion (e.g. a second end) of the securing element to the smart lock.

Continuing to use the generalised terms discussed above, the smart locking mechanisms described herein may comprise a first opening configured to receive a first portion (e.g. the first end 121A) of the securing element and/or a second opening configured to receive a second portion (e.g. the second end 121B) of the securing element. The bicycle rack attachment may comprise at least one fastener (e.g. bolts 123A and/or 123B, although screws, clips and various other fasteners can be used) configured to attach the smart lock to the bicycle rack, and at least one fastener is accessible via at least one of the first opening and/or the second opening. When at least one of the fasteners is accessible only by the second opening, only an operator can access that fastener and remove the smart lock from the bicycle rack.

The smart locks described herein may further comprise a moveable cover (such as cover 124), configured to conceal at least one fastener (e.g. bolt 123A) accessible via the first opening. There may be provided a control mechanism (e.g. an actuator that is controllable by a specific, bespoke tool, or a bolt or screw that is difficult to see and access). The bespoke tool may comprise a custom screw or bolt head. Alternatively, the security cover 124 may be held in place by a standard M3 or M4 bolt, which will need to be unscrewed before the cover can be moved, and moving the cover may be achieved using a magnet on the end of a long shaft in a way that would not be immediately apparent from visual inspection. In any case, there is a control mechanism configured to control a position of the moveable cover. The control mechanism may only be accessible via an opening other than the first opening. For example, the moveable cover may be inaccessible by the opening that a regular authorised user can access and only accessible via an opening (or openings) that a system operator can access. Thus, multiple fasteners can be concealed so that authorised users have no access to the fasteners.

In general terms, the first smart locking elements described herein may be configured to be locked and/or unlocked by: a cryptographic key associated with a smart lock operator; and a cryptographic key associated with the authorised user. The second smart locking element may be configured to be locked and/or unlocked by a cryptographic key associated with a smart lock operator, and configured to be inoperable by a cryptographic key associated with the authorised user. In this way, only certain users having certain keys can access internal components of the smart lock, while allowing regular authorised users to make use of the functionality of the smart locks described herein.

Figure 4:
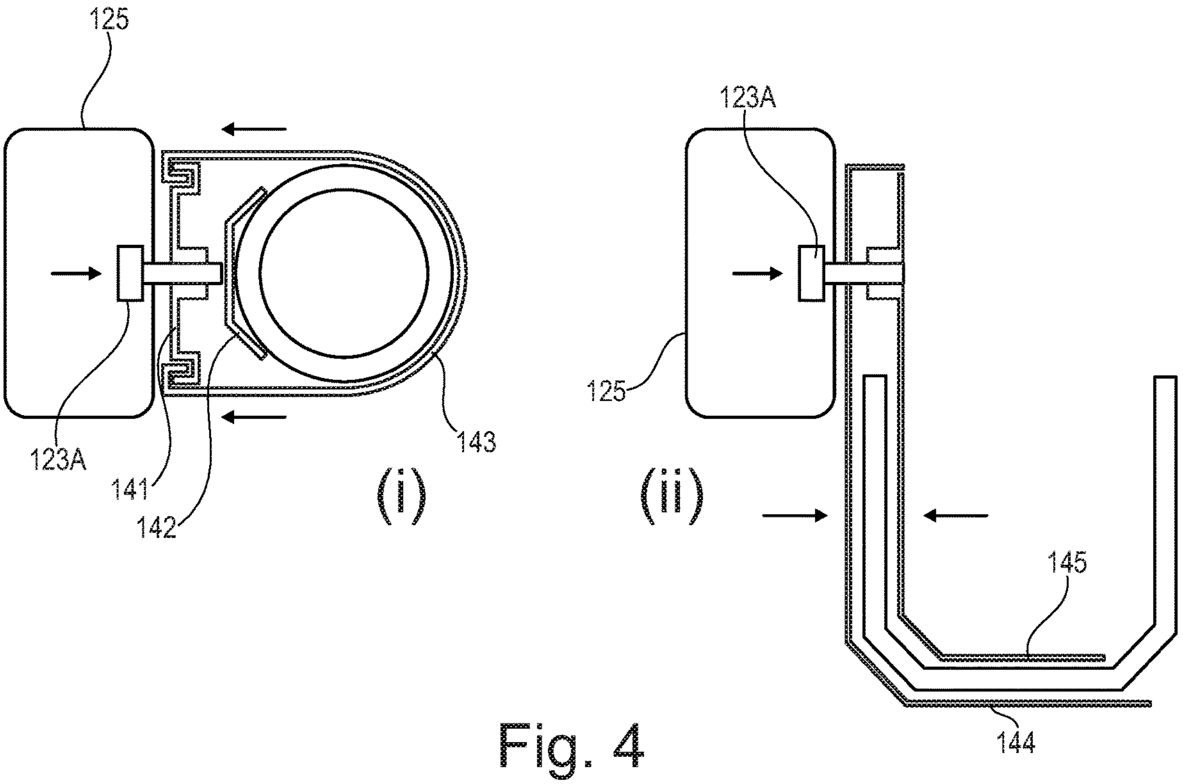
FIG. 4 shows schematically two examples of bicycle rack attachments for use with the smart locking mechanisms of the present disclosure.

Turning next to FIG. 4, there are shown two different examples of bicycle rack attachments, which may alternatively be described as mounting hardware for the bicycle locks described herein. These bicycle rack attachments are suitable for attaching the smart smart locking mechanisms 110 described herein to a bicycle rack. In this disclosure, the combination of a bicycle rack attachment and a smart locking mechanism constitutes a smart lock. The bicycle rack attachments are attached to existing cycle parking infrastructure through a system of mounting elements. The mount elements can be fitted without needing to modify the existing infrastructure as they mechanically clamp onto the existing parking infrastructure.

FIG. 4 shows simplified cross-section views of example mounting hardware used for the two most common styles of bicycle rack. In particular, FIG. 4 comprises two sub-figures, 4(*i*) on the left and 4(*ii*) on the right, which show examples of mount designs to suit different styles of bicycle rack. FIG. 4, sub-figure (i) is for a tubular metal rack mount (e.g. Sheffield racks) and FIG. 4, sub-figure (ii) is for a sheet metal rack mount (e.g. a two-tier rack). In FIG. 4, the arrows show the directions of forces within the smart locking mechanisms 110 and the mounting hardware 141-145.

In FIG. 4, sub-figure (i), it can be seen that a security bolt 123A threads into a first mounting element 141 to push a third mounting element 143 against a tubular rack. This pushing force is counteracted by a second mounting element 142 that is wrapped around the tubular rack. The first mounting element 141 and the second mounting element 142 interlock, so when the bolt 123A pushes against the third mounting element 143, the first mounting element 141 and the second mounting element 142 are drawn together and thus act as a clamp. Hence, the smart locking mechanism 110 is securely attached the bicycle rack and moreover, the bicycle rack attachment (comprising the first, second and third mounting elements 141, 142 and 143) is secured to the smart locking mechanism 110.

In FIG. 4, sub-figure (ii), it can be seen that a security bolt 123A can act to bring two mounting elements 144 and 145 together. The bolt 123A passes through the first mounting element 144 and screws into the second mounting element 145, with the sheet metal rack positioned between the two mounting elements 144 and 145. Thus, the first and second mounting elements 144 and 145 clamp the section of sheet metal rack sitting between them. Again, the security bolt 123A secures the smart locking mechanism 110 to the mounting elements 144 and 145 and also secures the mounting elements 144 and 145 to the rack.

In FIG. 4, sub-figures (i) and (ii), the security bolt 123A/123B holding the smart locking mechanism 110 to the mounting hardware 141-145 is one of the bolts 123A/123B that applies the clamping force of said mounting hardware 141-145. As seen in FIG. 2, these bolts 123A and 123B can only be accessed by an administrator who has accessed the smart locking mechanism 110 and fully removed the ends of the chain 121A and 121B. A normal authorised user cannot see or access these security bolts 123A and 123B.

It will be understood that many variations can be made to the bicycle rack attachments of FIG. 4. For example, the mounting elements can take any form. For instance, other shapes of bicycle rack can be accommodated by providing two mounting elements that conform to the shape of the bicycle rack and which can be drawn together by means of a fastener. While a bolt is a preferred fastener, various other types of fastener can be used, such as screws, clips, cuffs, shanks, buckles, clamps, pins, rivets and latches. Various combinations of different types of fastener may be employed.

In generalised language, each of sub-figures (i) and (ii) of FIG. 4 provide a bicycle rack attachment that is configured to clamp the bicycle rack so as to attach the smart lock to the bicycle rack. The bicycle rack attachments comprise (at least) first and second mounting elements (e.g. 141 and 142, or 144 and 145) and at least one fastener (e.g. one or more bolts, such as 123A and/or 123B) is (or are) configured to: draw the first and second mounting elements together to clamp the bicycle rack so as to attach the smart lock to the bicycle rack. This allows the smart lock to be securely mounted to a bicycle rack. Further mounting elements (e.g. third and fourth mounting elements) may also be provided for an improved mounting mechanism. Additionally or alternatively, at least one fastener (e.g. one or more bolts, such as 123A and/or 123B) is (or are) configured to draw the smart lock and the first and/or second mounting elements together so as to attach the smart lock to the first and/or second mounting elements. This provides a smart lock with an integrated mounting mechanism.

Preferably, at least one of the first mounting element and/or the second mounting element conforms to a shape of the bicycle rack. For instance, the mounting elements can have the same general shape as standard types of bicycle racks so that when they are drawn together, they form a tight, secure fit. Providing a secure fit to a bicycle rack ensures that levers (e.g. crow bars) cannot easily be placed between the smart lock and the bicycle rack, thereby reducing the risk of tampering.

Figure 5:
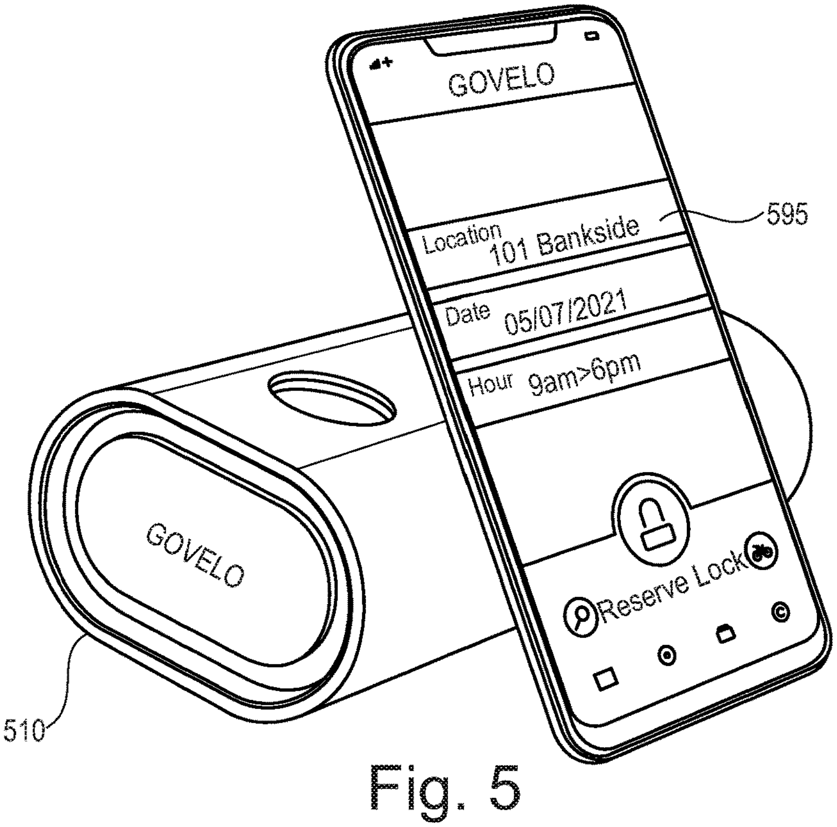
FIG. 5 shows a smart locking mechanism and mobile application.

In FIG. 5, there are shown a specific embodiment of a smart locking mechanism 510 of a smart lock for attachment to a bicycle rack and a mobile application 595 for controlling operation of the smart locking mechanism 510. The application 595 includes options for a user to select a location of a smart lock (e.g. 101 Bankside), and a date and time at which they would like to reserve a smart lock at that particular location.

In use, a user may tap the smart locking mechanism 510 at the given location with their phone (or other mobile device). This triggers a handshake and authentication process by the smart locking mechanism 510. Once the smart locking mechanism 510 has been successfully unlocked and re-locked, the application 595 will remember where the user's bicycle has been locked. At the end of day (or whenever the user is ready to unlock their bicycle), the user can navigate to the lock. The application 595 may provide navigation instructions at this stage to assist the user.

When locking and unlocking the lock 510, a similar procedure occurs. The user taps their phone against the smart locking mechanism 510, which initiates a near-field communication (NFC) handshake with the smart locking mechanism 510, and which causes the smart locking mechanism 510 to activate its Bluetooth. At this stage, the phone sends a secure code generated by a server and a unique user ID to the smart locking mechanism 510 over Bluetooth. In response, the lock smart locking mechanism logs the code and user ID for this particular session and the user can unlock the lock. In generalised language, the smart locking mechanism may be configured to (directly) communicate wirelessly (e.g. by Bluetooth Low Energy (BLE) and/or near-field communication (NFC)) to: receive (e.g. from a smartphone or custom card) one or more cryptographic keys for locking and/or unlocking the smart locking mechanism (e.g. to lock/unlock at least one of a first smart locking element and a second smart locking element); and/or transmit a data log to the mobile device of the authorised user (e.g. so that the mobile device can then transmit the data log to the servers for maintenance, billing and/or management of the smart lock).

Sensors in the smart locking mechanism 510 (e.g. sensor 133A) detect when the securing element (e.g. the chain, cable, and/or shackle) is removed from the smart locking mechanism 510 and automatically re-lock the smart locking mechanism 510 when the securing element is re-inserted. At this stage, the smart locking mechanism 510 is in a locked state and can only be opened by a phone with same user ID following a similar procedure. As noted previously, the smart locking mechanism 510 can use the user's phone to get data into and out of places with no reception, such as underground carparks, by providing its data logs to the authorised user's phone so that the phone can send those data logs to a server once connected to the internet.

Figure 6:
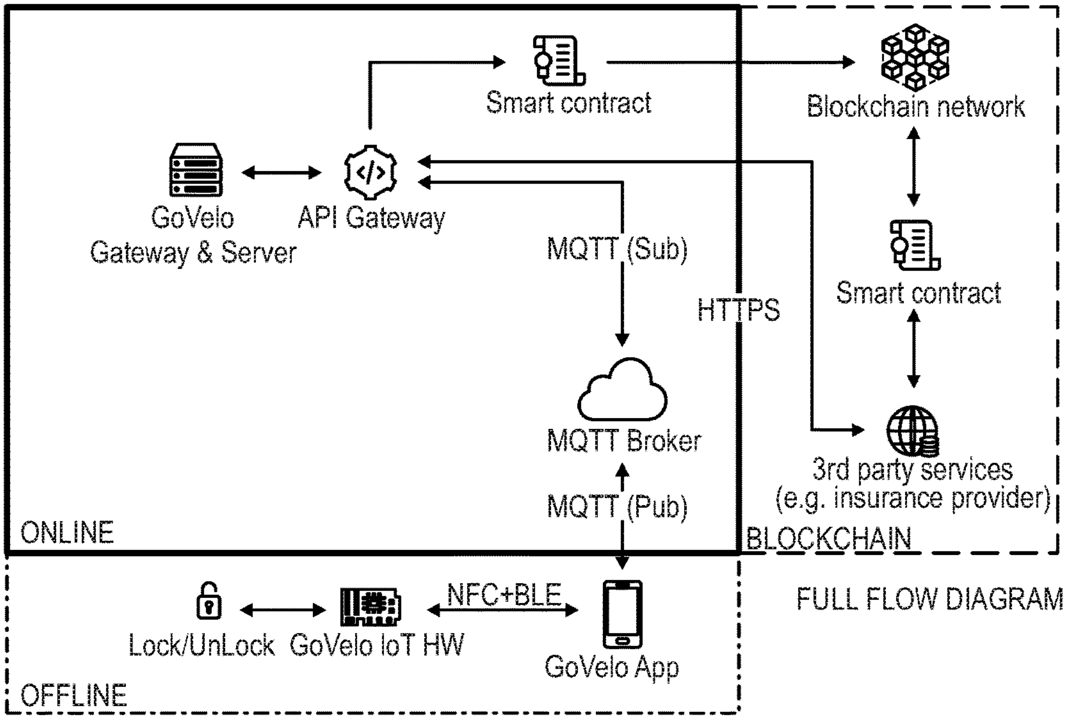
FIG. 6 shows an overview of an environment in which the smart locks of the present disclosure can be implemented, in more detail than the overview of FIG. 1.

Turning next to FIG. 6, there is shown a more detailed version of the environment of FIG. 1. In FIG. 6, the offline portions of the locking and unlocking are shown at the bottom of FIG. 6. Here, it can be seen that locking and unlocking of a smart lock is controlled by IoT hardware, which communicates over NFC and Bluetooth Low Energy (BLE) with a mobile application. This mobile application bridges to the online portion of the environment, which is shown above the offline portion. In particular, the online portion of the environment comprises the gateway and sever, which communicate over an API gateway with the user's mobile device, which may act as a MQTT broker in a publish/subscribe pattern. The MQTT broker manages the communications between the mobile application and the server and gateway.

Additionally, in FIG. 6, the API gateway allows the gateway and server to communicate with a blockchain network. For example, smart contracts can be executed and linked to third party services (such as insurance providers) and records of the transactions can be stored on a blockchain. These smart contracts and blockchains can be used to record usage patterns, billing information and to automatically execute further functionality based on certain rules for users. For example, when a particular user rents lock space, insurance may automatically be obtained via a smart contract and details of this insurance can be recorded in a blockchain (or any distributed ledger). Thus, interoperability, data security and are provided and data authenticity can be ensured.

Figure 7:
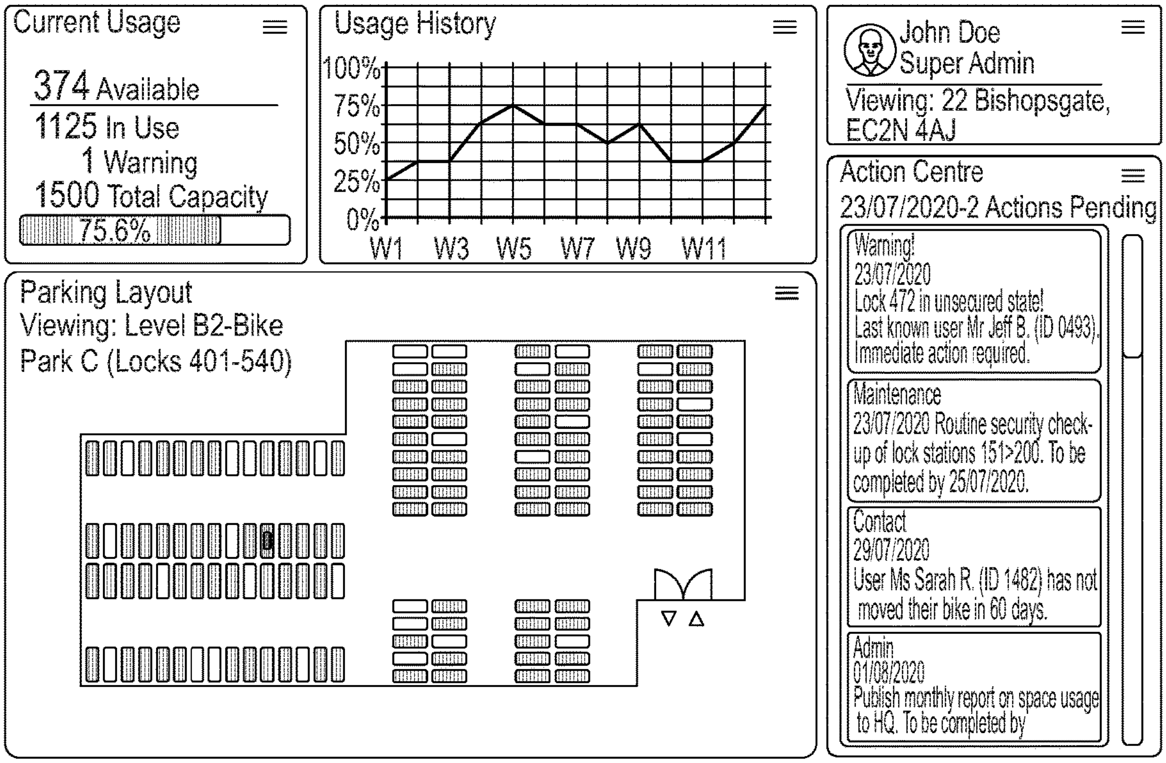
FIG. 7 shows a dashboard for a system administrator to manage a network of smart locks.

In FIG. 7, there is shown a dashboard for a system administrator to manage a network of smart locks, such as the smart locks described herein. The dashboard allows the administrator to view the current usage/occupancy of smart locks and historical usage. Moreover, a colour-coded map of locks can be provided to facilitate easy servicing and repair of smart locks in the field. A list of outstanding notifications and issues is also provided. For example, where a lock has been left unlocked by a user, this can be notified to an administrator who can then go and re-lock the lock. Similarly, if a lock notifies the dashboard that its battery is low, then an administrator can collect the lock for recharging or swap the lock for a charged lock.

Figure 8:
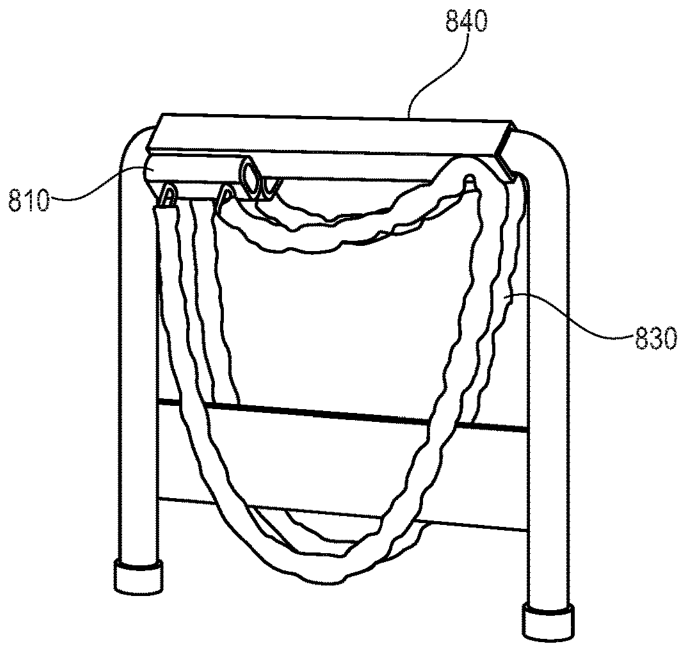
FIG. 8 shows a smart lock in situ, installed on a bicycle rack.

Turning next to FIG. 8, there is shown a smart lock in situ, installed on a bicycle rack. The smart lock comprises a smart locking mechanism 810, a bicycle rack attachment 840 and a securing element 830. The bicycle rack attachment 840 clamps the bicycle rack and the smart locking mechanism 810 is secured to the bicycle rack by the bicycle rack attachment 840, as described previously. The smart locking mechanism 810 releasably holds a securing element 830, which is a chain in this embodiment, which a user can use to releasably secure their bicycle to the smart lock and hence to the bicycle rack.

Figure 9:
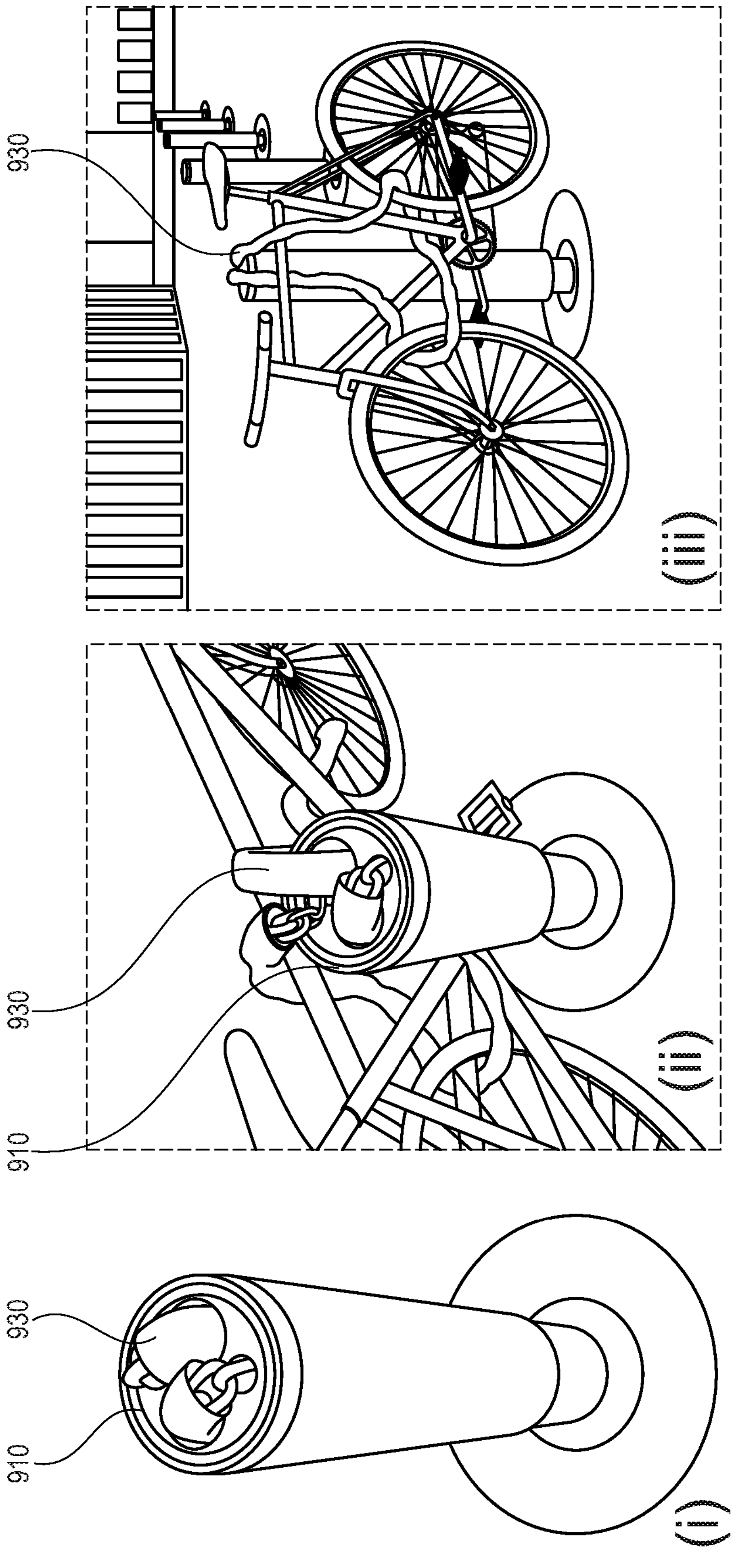
FIG. 9 shows an alternative bicycle locking system, in which a smart locking mechanism is integrated into a vertical pole.

Turning next to FIG. 9, there is shown an alternative bicycle locking system, in which a smart locking mechanism 910 is integrated into (rather than retrofitted to) a vertical pole. A securing element 930, which can be a chain or a cable, is provided in the vertical pole. An authorised user can unlock the smart locking mechanism 910 and use the securing element 930 to secure their bicycle to the pole in the same way as described previously. The smart locking mechanism 910 can operate as described previously in relation to FIGS. 1 to 8. Because it can be installed as a permanent fixture, the pole lock may be connected to the internet and may use mains power. In generalised terms, FIG. 9 provides a bicycle rack (e.g. having a long, straight body to provide a vertical pole when installed) configured for mounting to the ground (e.g. configured for mounting in an upright orientation). Such a bicycle rack may comprise any of the smart locking features described herein.

The securing element 930 may be retractable (e.g. through the use of springs or other resilient materials within the pole) so that it returns into the pole when not in use, although this is optional. FIG. 9(*i*) shows the securing element 930 in a retracted state, while FIG. 9(*ii*) shows the securing element 930 in an unretracted state and FIG. 9(iii) shows the securing element 930 securing a bicycle in use. While shown as being retractable in FIG. 9, the securing element 930 need not be retractable.

Advantages of the implementation of FIG. 9 include reduced space requirements. Moreover, because the pole is simply an upright pole and is not a conventional bicycle rack, a conventional D-lock or chain lock cannot be used by an unauthorised user to secure their bicycle. In the implementation of FIG. 9, the smart locking mechanism may be configured to communicate wirelessly with a user's mobile device by, for example, any one or more of: Bluetooth Low Energy (BLE); near-field communication (NFC); Bluetooth Mesh; Thread; Zigbee; ANT; a 2.4 GHz wireless protocol; NarrowBand-Internet of Things (NB-IoT); and/or LTE-M.

Figure 10:
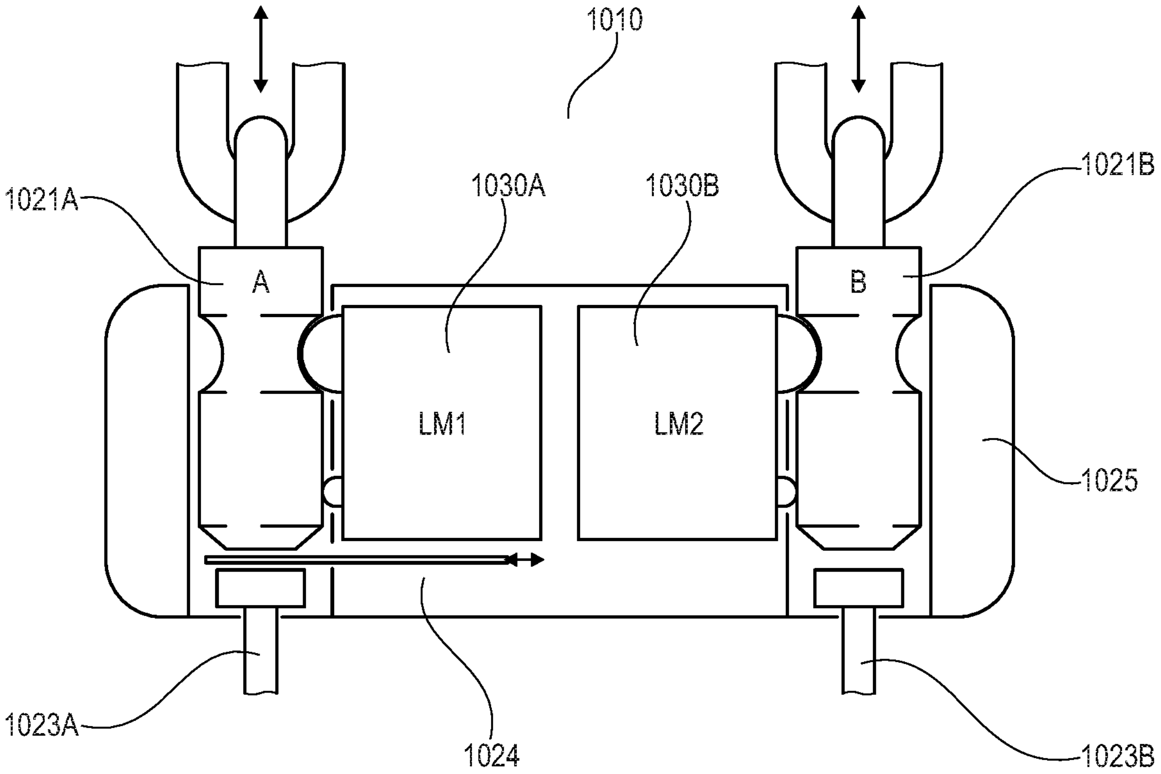
FIG. 10 shows schematically a simplified cross-section of a smart locking mechanism.

Turning next to FIG. 10, there is shown a smart locking mechanism 1010 having a main body 1025, which is similar to the smart locking mechanism 110 of FIG. 2. The smart locking mechanism 1010 comprises a securing element (a chain in this case) having first and second portions (i.e. ends) 1021A and 1021B, which can be inserted into the smart locking mechanism 1010. This is similar to the ends 121A and 121B of the securing element of the smart locking mechanism 110 of FIG. 2. The smart locking mechanism 1010 can be attached to a rack attachment mechanism (not shown) by the fasteners 1023A and 1023B, which are similar to the fasteners 123A and 123B of FIG. 2. A moveable cover 1024 is again provided, which is similar to the moveable cover 124 of FIG. 2. A difference between the smart locking mechanism 1010 of FIG. 10 and the smart locking mechanism 110 of FIG. 2 is the way in which the smart locking elements 1030A and 1030B operate.

Figure 11:
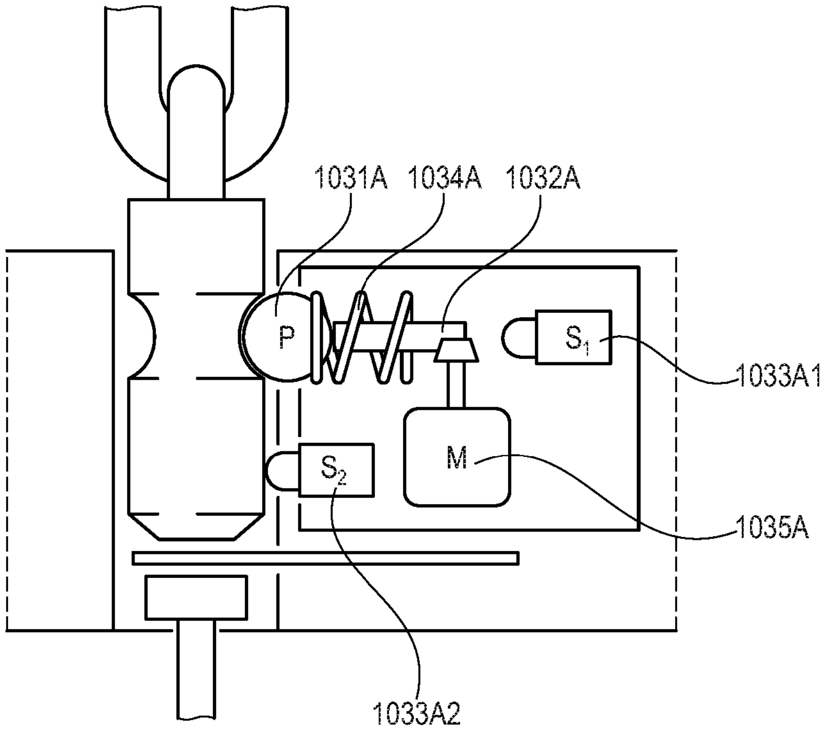
FIG. 11 shows the schematic smart locking mechanism of FIG. 10 in more detail.

FIG. 11 shows one of the smart locking elements 1030A of FIG. 10 in more detail. The other smart locking element 1030B may operate in the same way (albeit with the moveable cover 1024 omitted). In this embodiment, the locking pin 131A and the retaining protrusion 132A of the smart locking mechanism 110 of FIG. 2 are replaced by a locking structure that provides dual functionality. A locking protrusion 1031A (e.g. a 15 mm ball bearing, although other dimensions and shapes can be used) is provided, which can engage a corresponding recess in the securing element, thereby locking the securing element to the smart lock. The locking protrusion 1031A is driven into the recess of the securing element (i.e. into the opening of the smart locking mechanism 1010) by a locking motor 1035A that pushes against a locking pin 1032A that is in abutment with the locking protrusion 1031A. Any known actuator can be used for this purpose. The locking protrusion 1031A has a larger diameter than the opening through which it protrudes, to stop the locking protrusion 1031A falling out. The locking pin 1032A may pass through one or more watertight seals (using, for example, multiple o-rings or other sealing mechanisms) to prevent water damaging internal electronic components.

The locking protrusion 1031A may be isolated from the motor 1035A and biased towards the recess of the securing element. This is achieved using a retaining spring 1034A (any resilient biaser can be used), which urges the locking protrusion 1031A towards the recess of the securing element (i.e. into a locked position, in which the end of securing element is held within the respective opening). This provides similar functionality to the retaining protrusion 132A of FIG. 2. In particular, when a user inserts one end of the chain into the smart locking mechanism 1010 when the smart lock is in an unlocked state, the locking protrusion 1031A will be pushed into the recess of the chain (or other securing element), to loosely hold the end of the chain in place without fully locking the end of the chain in place. This prevents the chain from immediately falling out of the smart locking mechanism 1010 when unlocked (which could injure the user and/or damage the user's bicycle) and means that a user must physically pull the securing element out of the smart locking mechanism once the lock is open in order to use the lock. As the smart locks of this disclosure may be operated by a mobile application, the chain could fall from the lock immediately upon the user unlocking the lock from the mobile application if the retaining spring 1034A was omitted.

It is preferable that the locking protrusion 1031A and the locking pin 1032A are physically separate for the system to work efficiently. By providing the locking protrusion 1031A and the locking pin 1032A as separate components, the motor 1035A does not need to act against the force of the retaining spring 1034A when pulling the locking pin 1032A back to allow free movement of the locking protrusion 1031A. This saves energy and avoids placing the motor under extra stress. Nevertheless, the locking pin 1032A and the locking protrusion 1031A could be integrally formed in some cases.

In the generalised terms used previously, the retaining protrusion may be a locking pin of the smart lock. The retaining protrusions described herein may be biased towards a locked state. For example, the retaining protrusions described herein may be biased such that the retaining protrusion holds the securing element in place even when the smart locking mechanism is unlocked, without the smart locking mechanism actually being locked. This may allow a user to remove the securing element from the smart locking mechanism while preventing the securing element from falling out of the locking mechanism too easily.

A further difference in this smart locking element 1030A is there are first and second sensors 1033A1 and 1033A2, rather than a single sensor 133A. The first sensor 1033A1 senses the position of the locking pin 1032A while the second sensor senses the position of the end of the chain. This provides additional reliability, by ensuring that the locking pin 1032A is in a locked position, and also that the chain is in the correct position to be locked. In general terms, there may be a plurality of sensors, configured to sense whether the smart locking mechanism is in a locked or unlocked position (e.g. by sensing the position of the locking pin 1032A). If one sensor detects that the securing element is not secured but the smart locking element is in a locked position, then an alert (e.g. an audible alert) may be generated to prevent a user failing to lock their bicycle securely. The sensors can be of any type (including preferably microswitches, although induction sensors can also be used in principle).

In some embodiments, the first 1033A1 and/or second sensor 1033A2 could comprise a ball bearing that gets pushed back to activate a microswitch when the chain plug is fully inserted into the chain socket. A similar microswitch may be positioned behind the locking pin 1032A and may be activated by the locking pin 1032A when a user pulls the securing element out of the smart locking mechanism. These 2 switches may work together to allow an on-board processor to know the current lock state of the smart lock.

Figure 12A:
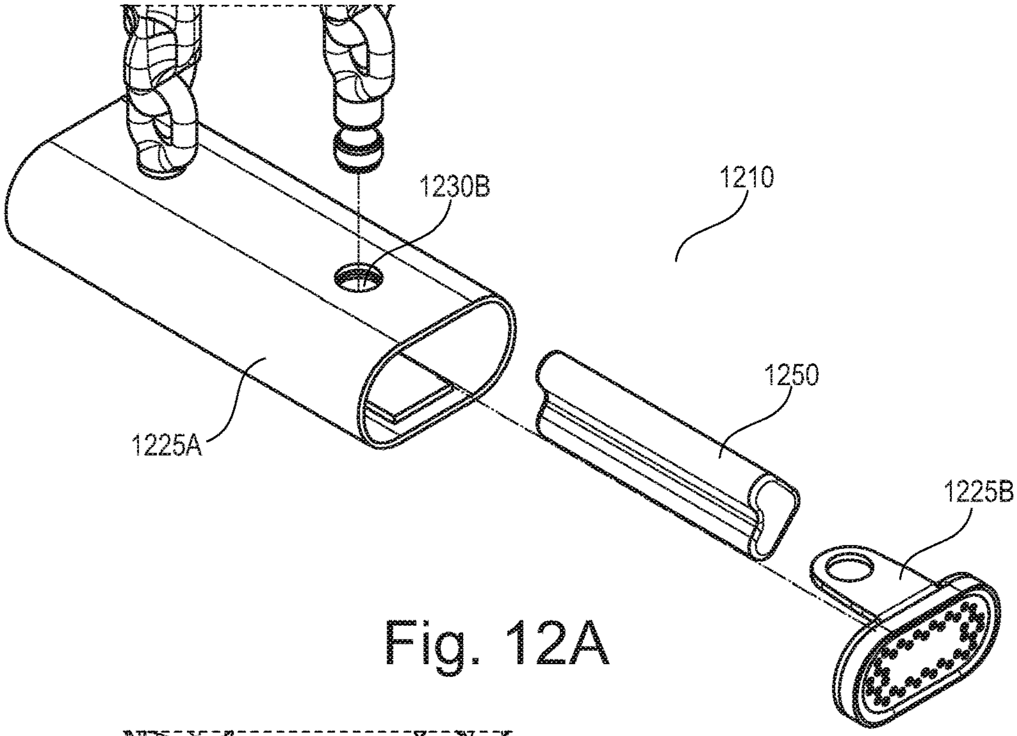
FIG. 12A shows schematically a smart locking mechanism having a removable surface.

In FIG. 12A, a further smart locking mechanism 1210 is shown. The smart locking mechanism 1250 has a removable battery. One surface 1225B of the body of the smart locking mechanism 1210 (in this case, one end) is removable to permit access to any of the internal components, for servicing. The removable surface 1225B may permit removal of the battery 1250, so that a system administrator can easily swap a depleted battery for a fully-charged battery.

The removable surface 1225B can be secured to the remainder of the body of the smart locking mechanism 1225A. The removable surface of the body of the smart locking mechanism may be secured by the smart locking element that is operable by an operator of the smart lock (but not a regular authorised user of the smart lock), such as the smart locking element 1230B, which operates in the same way as elements 130B, LMS2 or 1030B, LM2 described previously. Thus, the surface of the smart locking mechanism 1225B may be removable using the administrator key (but not the key of a regular authorised user). In FIG. 12A, the removable surface 1225B comprises an opening configured to permit the securing element of the smart lock to pass through and thereby secure the removable surface 1225B to the remainder of the body of the smart lock 1225A.

In FIG. 12A, the removable surface has small holes for allowing sound (e.g. audible alerts from a speaker) to leave the smart locking mechanism. However, the holes may be omitted entirely or may be placed on the other surface 1225A of the smart locking mechanism 1210.

Figure 12B:
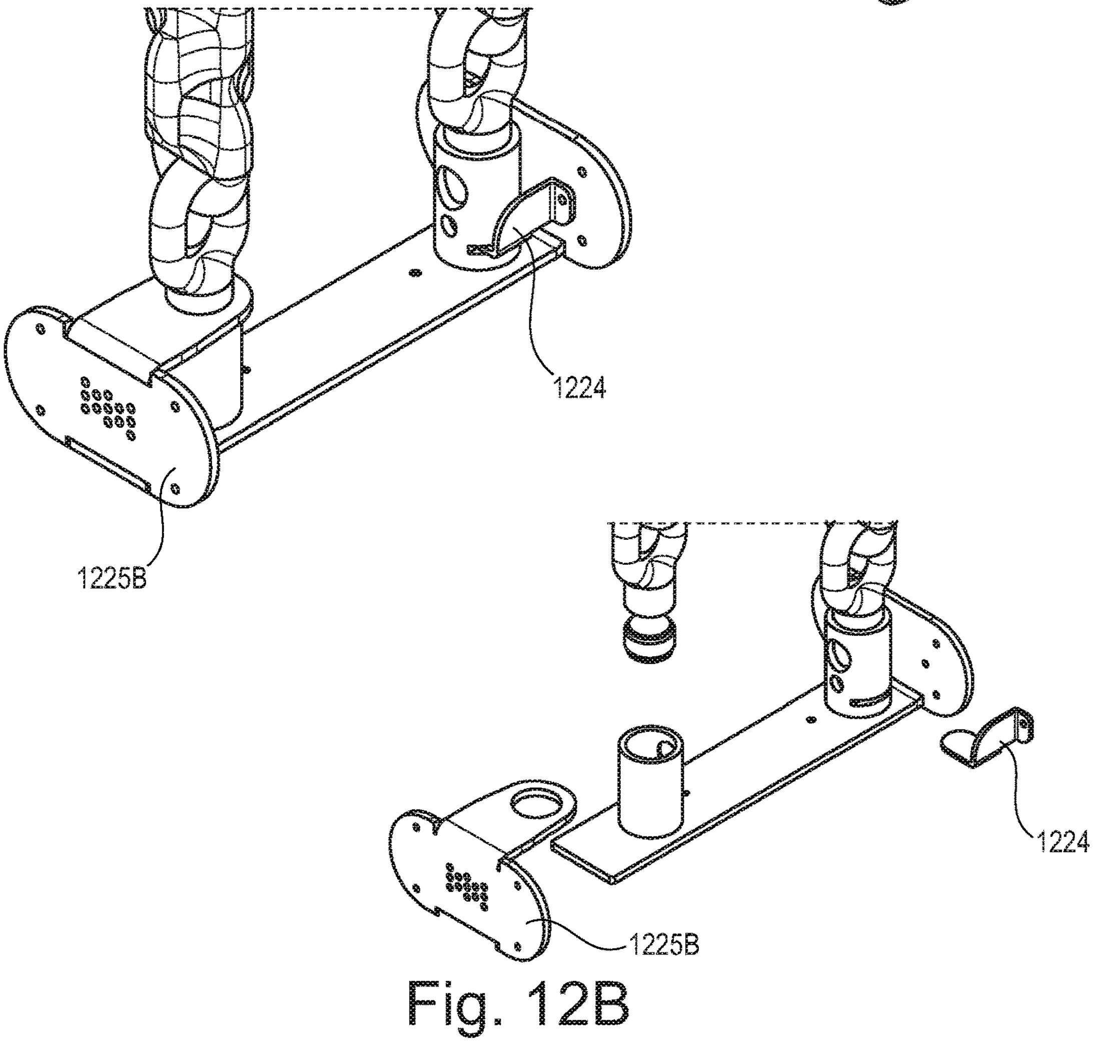
FIG. 12B shows schematically a smart locking mechanism having a moveable cover in two configurations.

FIG. 12B shows how a moveable cover 1224 can be accessed by unlocking the B end (i.e. the end that only an administrator can unlock) of the smart locking mechanisms described previously. In particular, by unlocking the B end of the smart locking mechanism, a surface 1225B can be removed. With this surface 1225B removed, an administrator can access a fastener (e.g. a bolt or screw) used to secure the moveable cover 1224 in place. In the left hand side of FIG. 12B, the moveable cover 1224 is secured to a surface at the A side of the smart locking mechanism. The moveable cover 1224 can be released from the position shown on the left of FIG. 12B and the right hand side of FIG. 12B shows the moveable cover 1224 when it has been moved. It can be seen how the moveable cover 1224 can slide out from its position so that the fasteners of the attachment mechanism can be accessed via the A side of the smart locking mechanism, to permit complete removal of the smart lock from a bicycle rack. In FIG. 12B, the moveable cover 1224 is held in place by an M3 bolt which needs to be unscrewed, before a technician can use a long magnetic screwdriver from the B end of the smart locking mechanism to tease the moveable cover 1224 out and permit removal of the smart locking mechanism. Of course, it will be recognised that other types of fastener can be used instead of M3 bolts, and the moveable cover 1224 can be attached to various different surfaces of the smart lock and hence can be accessed from different directions.

Figure 13:
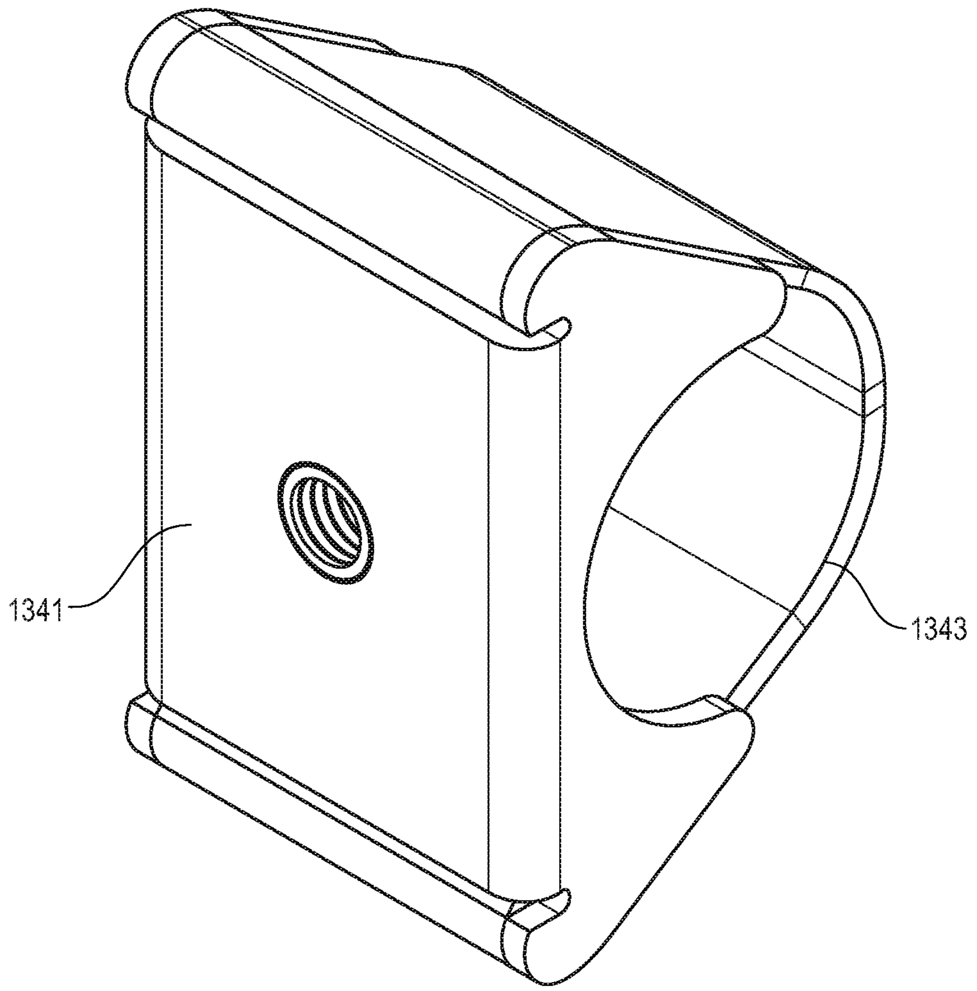
FIG. 13 shows schematically an assembled bicycle rack attachment for a tubular bicycle rack.
Figure 14:
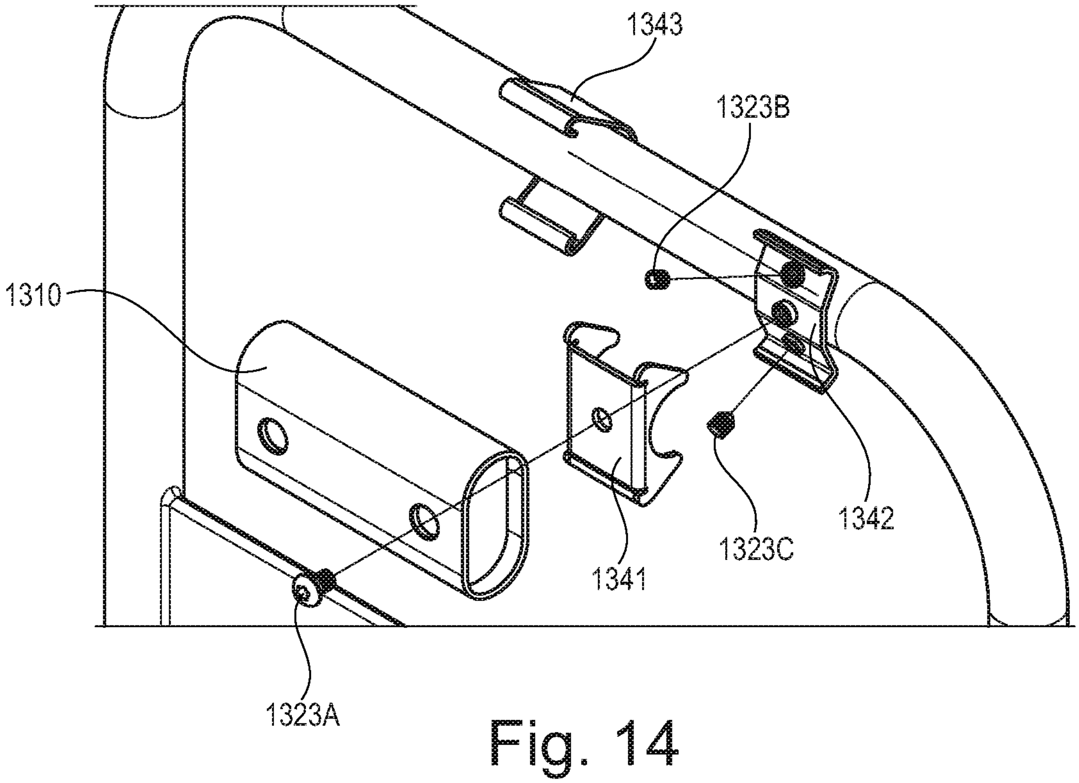
FIG. 14 shows schematically an exploded view of the bicycle rack attachment of FIG. 13.
Figure 15:
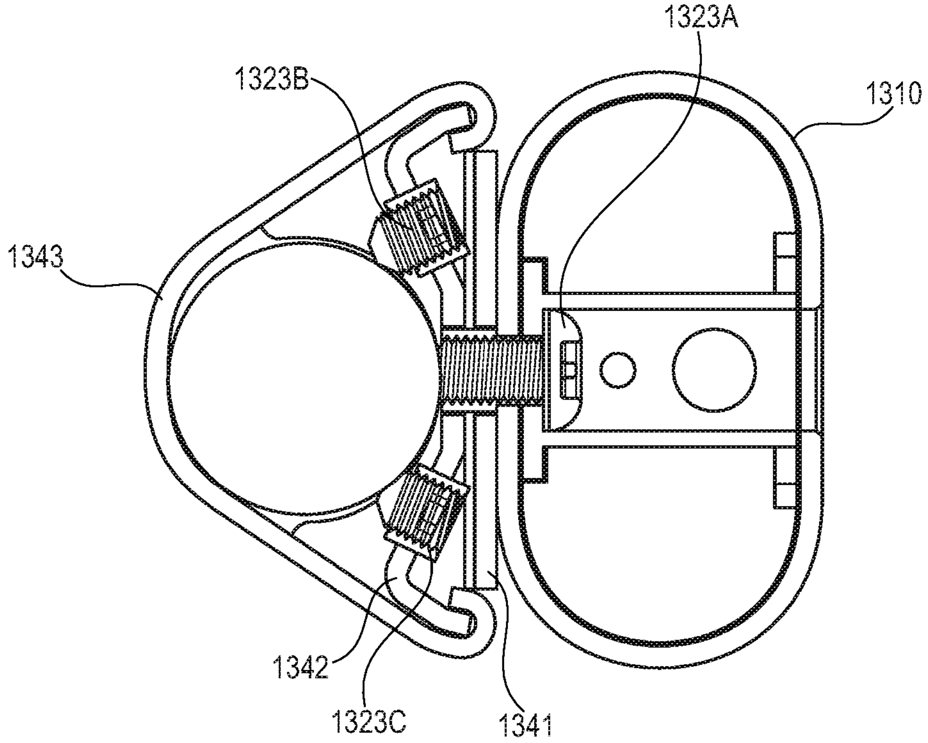
FIG. 15 shows schematically a cross-section of the bicycle rack attachment of FIGS. 13 and 14 in situ.

In FIGS. 13 to 15, an attachment mechanism for a tubular rack is shown. The attachment mechanism can be used to attach the smart locks 1310 described herein to both straight and curved racks of various radii. For example, the steel tube that some racks are made from has a nominal diameter of 50 mm (+/−3 mm; shims, which may be made from steel, can be provided to pad out the difference). The tightest bending radius of most conventional bicycle racks is 150 mm (which can be seen in the left-most example in FIG. 16: the "shoulders" of the M-shaped rack). Therefore, the attachment mechanisms described herein are configured to fit 50 mm nominal tubular rack sections that can range from being completely flat all the way to having a bend radius of 150 mm. Of course, racks having various other various other radii can be accommodated. The attachment mechanisms described herein may be used in pairs, with two of the attachment mechanisms shown in FIG. 3 being used to secure a single smart lock to a bicycle rack, with each attachment mechanism sitting directly below the smart locking mechanism's mounting opening.

The attachment mechanism comprises three parts, 1341, 1342 and 1343, held together by, in this embodiment, three fasteners which comprise 2×M12 (or alternatively M10) grub screws 1323B and 1323C and an M12 bolt 1323A. The screws and bolt act as fasteners that secure the smart locking mechanism 1310 to the bicycle rack attachment and secure the bicycle rack attachment to a bicycle rack. The grub screws 1323B and 1323C are used to apply pressure directly to the bicycle rack. The central M12 bolt 1323A holds the smart lock to the attachment mechanism and sits at the bottom of the lock's opening for receiving a securing element. FIG. 13 shows the attachment mechanism in isolation, while FIG. 14 shows an exploded view and FIG. 15 shows the attachment mechanism in situ, being used to secure a smart locking mechanism 1310 to a bicycle rack. The attachment mechanism functions similarly to the attachment mechanism of FIG. 4(*i*), with additional fasteners (grub screws) provided on one of the mounting elements (e.g. the second mounting element 142 of FIG. 4(*i*)) to directly contact a bicycle rack. In FIG. 15, a frontal cross section of the attachment mechanism shows how the grub screws 1323B and 1323C apply force to the bicycle rack, causing the middle plate 1342 to push up into the grooves of the curved plate 1343 that wraps around the bicycle rack. The top "cover" plate 1341 acts mainly to hide the bolts 1323A, 1323B and 1323C below it, to prevent tampering, but also exerts some force to the rack.

Figure 16:
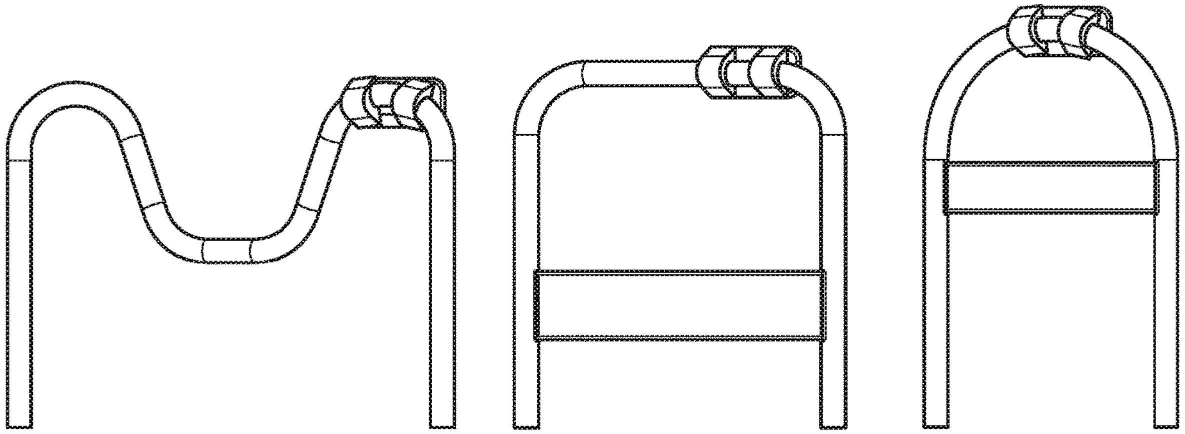
FIG. 16 shows schematically the bicycle rack attachment of FIGS. 13 to 15 in situ on different bicycle racks.

FIG. 16 shows how the bicycle rack attachments described herein can be used to provide a smart lock that can be attached to various different types of tubular racks having different curvature.

Figure 17:
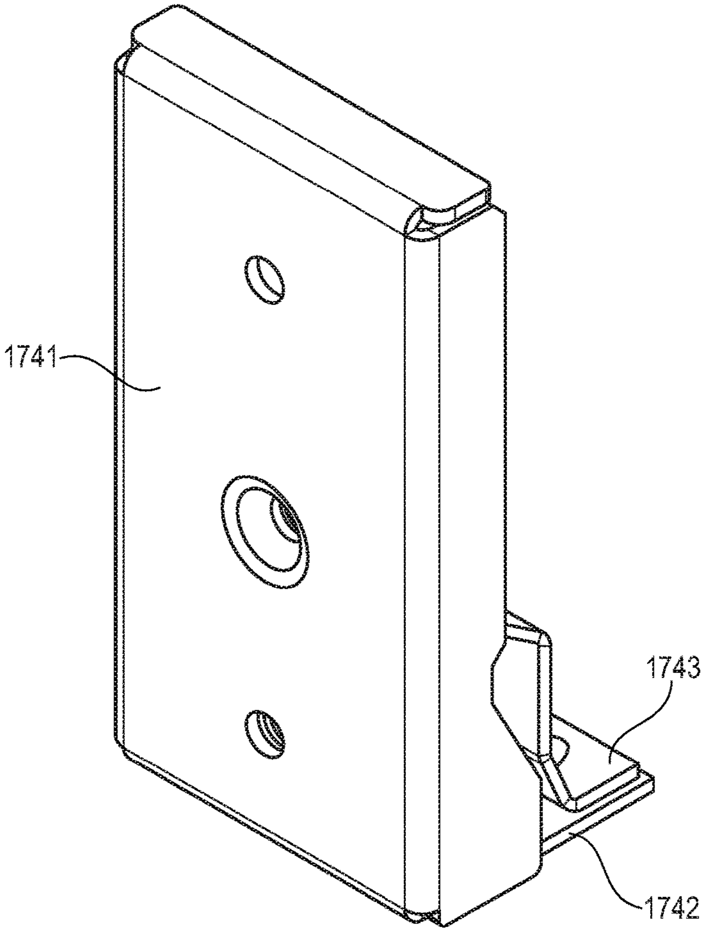
FIG. 17 shows schematically a bicycle rack attachment for a sheet metal bicycle rack.
Figure 18:
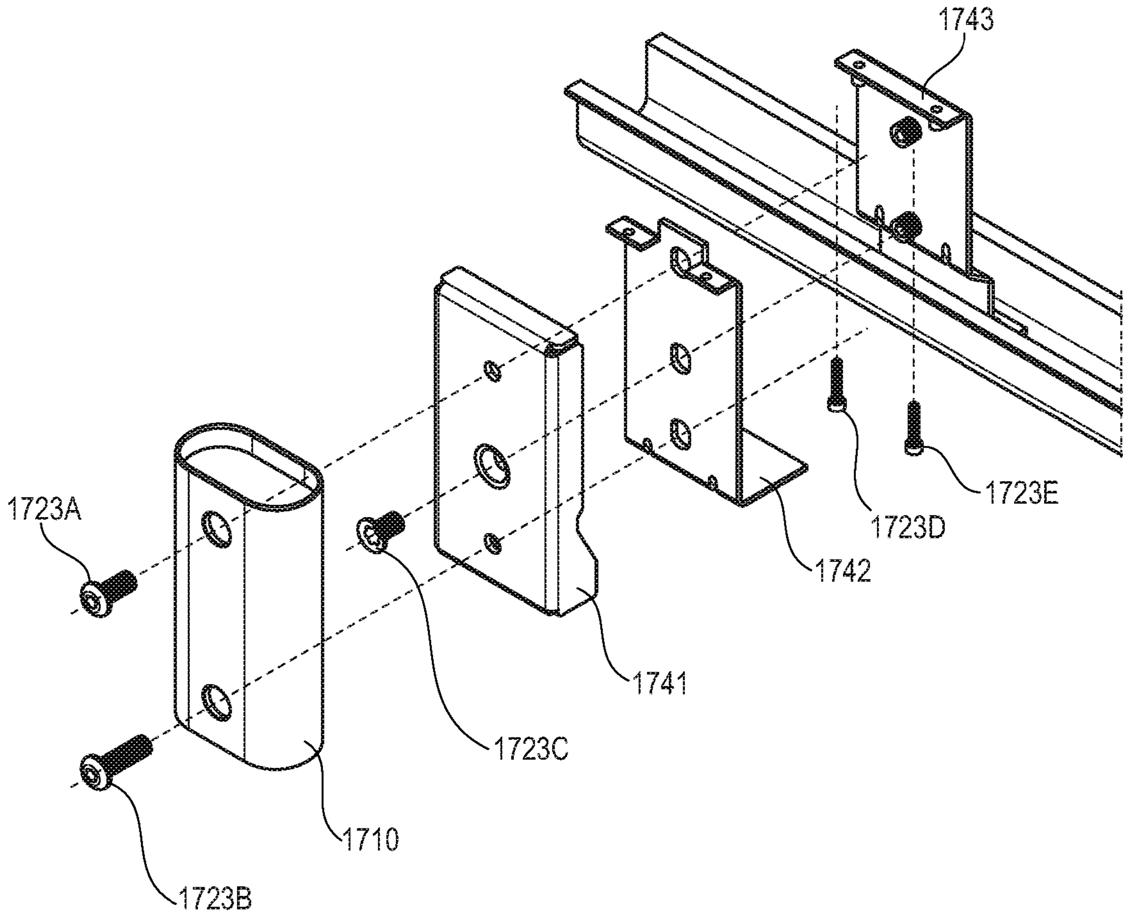
FIG. 18 shows schematically an exploded view of the bicycle rack attachment of FIG. 17.
Figure 19:
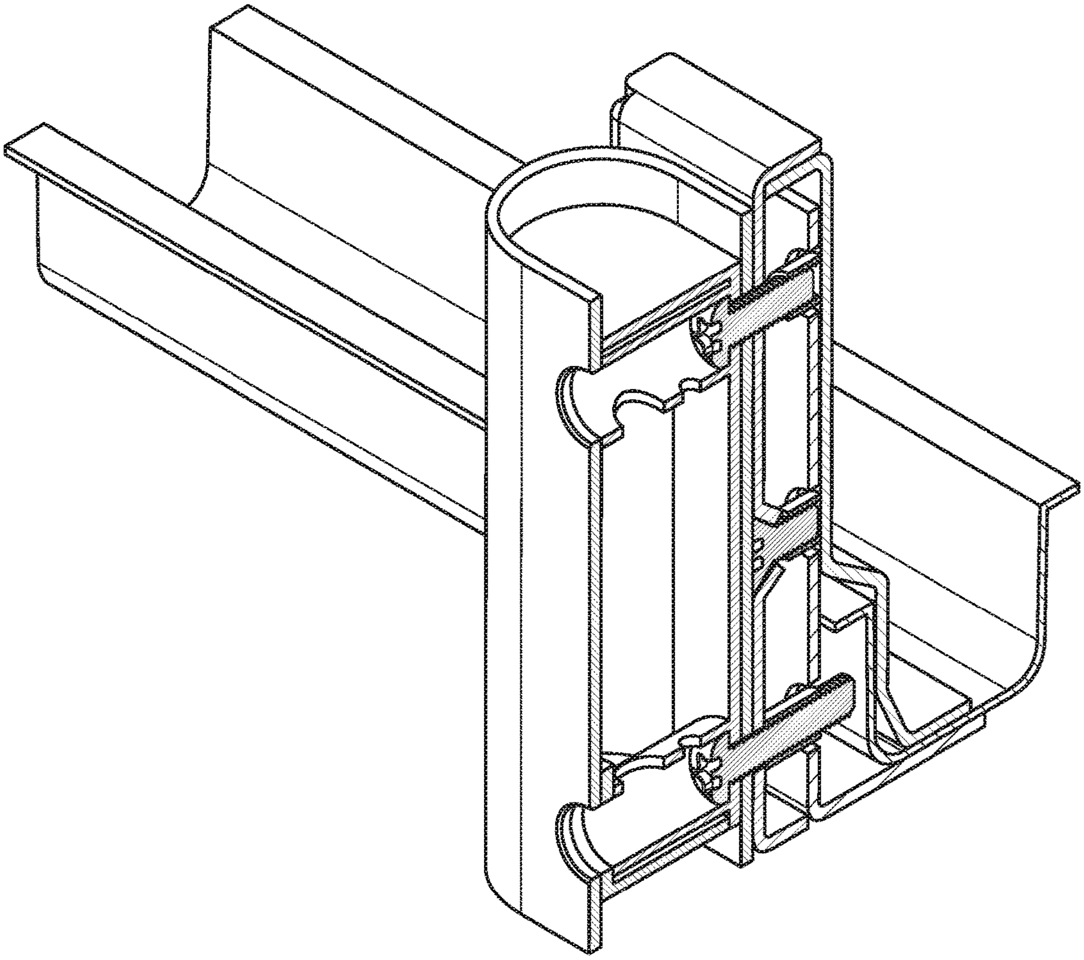
FIG. 19 shows schematically the bicycle rack attachment of FIGS. 17 and 18 in situ.

FIG. 17 to 19 show an attachment mechanism for a sheet metal rack, which acts in a similar way to the attachment mechanism shown in FIG. 4(*ii*). This attachment mechanism is designed for 2-tier systems and can be used on either upper or lower bike rail. The shape of the clamp is designed to fit a large number of sheet steel rack rails. Unlike the mounts for the tubular racks, in this embodiment only one attachment mechanism is provided per lock.

The mount is made from 3 parts 1341, 1342 and 1343, and is held together by a plurality of (five) fasteners: 2× standard M6 bolts 1723D and 1723E, 2× standard M12 bolts 1723A and 1723B, and 1× countersunk M12 bolt 1723C. The 2× M6 bolts 1723D and 1723E are used to apply vertical pressure to the rack by tightening together the base (rightmost) 143 and middle 142 plates. The top "cover" (leftmost) plate 141 applies lateral pressure when tightened using the countersunk M12 bolt 1723C. The 2× standard M12 bolts 1723A and 1723B hold the lock to the attachment mechanism and sit at the bottom of the lock's securing element openings (i.e. the openings into which the chain may be inserted). FIG. 17 shows the attachment mechanism in isolation, FIG. 18 shows an exploded view of the attachment mechanism and FIG. 19 shows the lock and attachment mechanism in situ, attached to a bicycle rack, with reference numerals omitted to improve clarity.

The uppermost two M12 bolts 1723A and 1723C work together to apply a lateral force to the rack by clamping the base plate 1743 to the middle 1742 and top 1741 plates. The lower M12 bolt 1723B is mainly to hold the lock 1710 in position on the mount, but also makes it harder for someone to use leverage to dislodge the mount. The M6 bolts 1723D and 1723E at the top pull on the middle plate 142 by threading into the base plate 1743.

Figure 20:
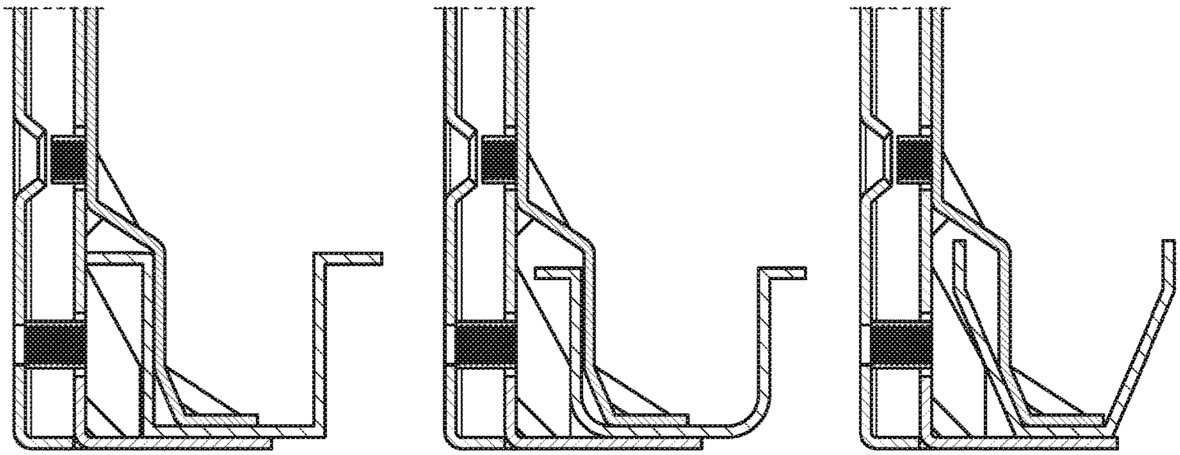
FIG. 20 shows schematically the bicycle rack attachment of FIGS. 17 to 19 in situ on different bicycle racks.

FIG. 20 shows how the attachment mechanism of FIGS. 17 to 19 can be used to provide a smart lock that can be attached to various different types of sheet metal racks. In particular, this Figure shows how the attachment mechanism is able to clamp onto the rack profiles of the of the most common 2-tier rack manufacturers.

Thus, while the attachment mechanisms of FIGS. 13 to 16 and 17 to 20 have different structures and are suitable for different types of bicycle racks, they share a number of features in common, including: the use of concealed fasteners; the use of clamping forces; and the use of fasteners to simultaneously clamp the smart locking mechanism to the attachment mechanism and the attachment mechanism to the bicycle rack.

It will be understood that many variations may be made to the above apparatus, systems and methods whilst retaining the advantages noted previously. For example, where specific components have been described, alternative components can be provided that provide the same or similar functionality.

The disclosure has been described by reference to a single smart lock. However, it will be appreciated that plural smart locks as described herein can be provided, to allow users to rent bicycle parking space at numerous locations without needing to carry a lock. Moreover, existing bicycle parking locations can be converted into smart bicycle parking using the retrofittable smart locks described herein.

Thus, for example, the disclosure provides a system for permitting an authorised user (or multiple such users) to use a smart lock (or multiple smart locks at disparate locations), the system comprising: a server configured to generate a cryptographic key associated with the authorised user (or users) and to provide the generated cryptographic key to a mobile device of the authorised user; and a smart lock as described herein, configured to be locked and/or unlocked by the generated cryptographic key. Thus, users can temporarily use the smart locks disclosed herein and the locks can be used by others. Such a system can be retrofitted to upgrade existing cycle parking infrastructure, avoiding waste (e.g. there is no need to remove/discard old infrastructure) and improving convenience.

The smart locks described herein may have various components mounted at either end of the chassis. For example, one end of the smart locks described herein may house LEDs and antennas, with a polycarbonate lens to diffuse the light for the LEDs. The other end may have a speaker grille. For example, the smart locks described herein may have an alarm speaker to allow sound out of the case. In all embodiments of the present disclosure, the locking mechanism's housing may comprise a processor that operates the lock, which may sit in a watertight enclosure.

As described previously, the smart locks described herein may be configured to transmit a data log to the mobile device of an authorised user in response to receiving a generated cryptographic key from the mobile device of the authorised user. In this way, data logs can be provided to users and the server may be configured to receive, from the mobile device of an authorised user, the data log. Also provided herein is an application for a mobile device of an authorised user, the application configured to receive the data log from the smart lock and to transmit the data log to the server. Data logs may comprise key validation information and measurements of usage and session duration (e.g. for billing purposes), and tampering of the lock (e.g. for maintenance purposes). The applications may be configured to store the data log temporarily and to delete at least a portion of the data log after the data log has been transmitted to the server. The applications may be configured to store the data log temporarily while an internet connection is unavailable and to transmit the data log to the server after an internet connection becomes available. Thus, the locks described herein can be installed in locations that do not have reliable internet access, by leveraging users' devices.

It will be appreciated that embodiments of the disclosure may be implemented using a variety of different information processing systems. In particular, although the figures and the discussion thereof provide exemplary computing systems and methods, these are presented merely to provide a useful reference in discussing various aspects of the disclosure. Embodiments may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of systems and methods that may be used. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules. Moreover, multiple method steps implemented in flowcharts contained herein, or as described above, may be implemented together by a single module.

It will be appreciated that, insofar as embodiments of the disclosure are implemented by a computer program, then a storage medium and a transmission medium carrying the computer program form aspects of the disclosure. The computer program may have one or more program instructions, or program code, that, when executed by a computer, causes an embodiment of the disclosure to be carried out. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as a smart locking element or a mounting element) means "one or more" (for instance, one or more smart locking elements, or one or more mounting elements). Throughout the description and claims of this disclosure, the words "comprise", "including", "having" and "contain" and variations of the words, for example "comprising" and "comprises" or similar, mean that the described feature includes the additional features that follow, and are not intended to (and do not) exclude the presence of other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

A method of manufacturing and/or operating any of the disclosed herein is also provided. The method may comprise steps of providing each of the features disclosed and/or configuring or using the respective feature for its stated function.

The invention claimed is:

1. A smart lock for securing a bicycle to a bicycle rack, comprising:
- a bicycle rack attachment, configured to attach the smart lock to the bicycle rack; and
- a smart locking mechanism, distinct from the bicycle rack attachment, configured to permit an authorised user to releasably secure the bicycle to the smart lock;
- wherein the bicycle rack attachment is configured to clamp the bicycle rack so as to attach the smart lock to the bicycle rack;
- further comprising a securing element configured to releasably secure the bicycle to the smart lock,
- wherein the smart locking mechanism comprises a first smart locking element configured to releasably secure a portion of the securing element to the smart lock; and
- wherein the first smart locking element is configured to be locked and/or unlocked by a cryptographic key associated with a smart lock operator, and configured to be inoperable by a cryptographic key associated with the authorised user.

2. The smart lock of claim 1, wherein the bicycle rack attachment is configured so that at least a portion of the bicycle rack attachment is concealed by a body of the smart lock when the smart lock is attached to the bicycle rack.

3. The smart lock of claim 1, wherein the bicycle rack attachment comprises at least one fastener configured to attach the smart lock to the bicycle rack.

4. The smart lock of claim 3, wherein the at least one fastener is concealed by a body of the smart lock and/or the bicycle rack attachment when the smart lock is attached to the bicycle rack.

5. The smart lock of claim 3, wherein the at least one fastener is at least partially within a body of the smart lock.

6. The smart lock of claim 1, wherein the bicycle rack attachment comprises at least first and second mounting elements and at least one fastener that is configured to:
- draw the first and second mounting elements together to clamp the bicycle rack so as to attach the smart lock to the bicycle rack; and/or
- draw the smart lock and the first and/or second mounting elements together so as to attach the smart lock to the first and/or second mounting elements.

7. The smart lock of claim 6, wherein at least one of the first mounting element and/or the second mounting element conforms to a shape of the bicycle rack.

8. The smart lock of claim 1, wherein at least one fastener of the bicycle rack attachment is concealed by the securing element when the securing element is in a locked configuration.

9. The smart lock of claim 8, wherein the smart locking mechanism comprises a first opening configured to receive a first portion of the securing element and/or a second opening configured to receive a second portion of the securing element.

10. The smart lock of claim 1, wherein the smart locking mechanism comprises a second smart locking element configured to releasably secure a second portion of the securing element to the smart lock.

11. The smart lock of claim 10, wherein the second smart locking element is configured to be locked and/or unlocked by the cryptographic key associated with a smart lock operator; and the cryptographic key associated with the authorised user.

12. A smart lock for securing a bicycle to a bicycle rack, comprising:
- a bicycle rack attachment, configured to attach the smart lock to the bicycle rack; and
- a smart locking mechanism, distinct from the bicycle rack attachment, configured to permit an authorised user to releasably secure the bicycle to the smart lock;
- wherein the bicycle rack attachment is configured to clamp the bicycle rack so as to attach the smart lock to the bicycle rack; and
- a securing element configured to releasably secure the bicycle to the smart lock,
- wherein the smart locking mechanism comprises a first smart locking element configured to releasably secure a first portion of the securing element to the smart lock and/or a second smart locking element configured to releasably secure a second portion of the securing element to the smart lock; and
- wherein the first smart locking element and/or the second smart locking element comprises a retaining protrusion configured to retain the securing element when the first smart locking element and/or the second smart locking element is unlocked.

13. The smart lock of claim 12, wherein the retaining protrusion comprises a locking pin of the first and/or second smart locking element.

14. The smart lock of claim 13, wherein the retaining protrusion comprises a locking pin of the first and/or second smart locking element that is resiliently biased to a locked position when the first smart locking element and/or the second smart locking element is unlocked.

15. The smart lock of claim 12, wherein the smart locking mechanism comprises a first opening configured to receive a first portion of the securing element and/or a second opening configured to receive a second portion of the securing element.

16. The smart lock of claim 12, further comprising at least one fastener of the bicycle rack attachment that is concealed by the securing element when the securing element is in a locked configuration.

17. A smart lock for securing a bicycle to a bicycle rack, comprising:

a bicycle rack attachment, configured to attach the smart lock to the bicycle rack; and a smart locking mechanism, distinct from the bicycle rack attachment, configured to permit an authorised user to releasably secure the bicycle to the smart lock;

wherein the bicycle rack attachment is configured to clamp the bicycle rack so as to attach the smart lock to the bicycle rack; and a securing element configured to releasably secure the bicycle to the smart lock, wherein the smart locking mechanism comprises a first opening configured to receive a first portion of the securing element and/or a second opening configured to receive a second portion of the securing element; and wherein the bicycle rack attachment comprises at least one fastener that is configured to attach the smart lock to the bicycle rack, and the at least one fastener is accessible via at least one of the first opening and/or the second opening.

18. The smart lock of claim 17, further comprising a moveable cover configured to conceal the at least one fastener accessible via the first opening and wherein the moveable cover is configured such that, in use, the at least one fastener is not visible via the first opening.

19. The smart lock of claim 18, further comprising a control mechanism configured to control a position of the moveable cover.

20. The smart lock of claim 19, wherein the control mechanism is inaccessible via the first opening and accessible via an opening of the smart lock other than the first opening.

* * * * *